US010687345B2

United States Patent
Park et al.

(10) Patent No.: US 10,687,345 B2
(45) Date of Patent: Jun. 16, 2020

(54) METHOD FOR TRANSMITTING AND RECEIVING UPLINK SIGNAL IN WIRELESS COMMUNICATION SYSTEM SUPPORTING UNLICENSED BAND AND APPARATUS FOR SUPPORTING SAME

(71) Applicant: LG ELECTRONICS INC., Seoul (KR)

(72) Inventors: Hanjun Park, Seoul (KR); Joonkui Ahn, Seoul (KR); Seonwook Kim, Seoul (KR); Suckchel Yang, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 15/780,604

(22) PCT Filed: Dec. 28, 2016

(86) PCT No.: PCT/KR2016/015381
§ 371 (c)(1),
(2) Date: May 31, 2018

(87) PCT Pub. No.: WO2017/116132
PCT Pub. Date: Jul. 6, 2017

(65) Prior Publication Data
US 2018/0359772 A1    Dec. 13, 2018

Related U.S. Application Data

(60) Provisional application No. 62/273,444, filed on Dec. 31, 2015, provisional application No. 62/275,238, (Continued)

(51) Int. Cl.
*H04W 4/00* (2018.01)
*H04W 72/12* (2009.01)
(Continued)

(52) U.S. Cl.
CPC ....... *H04W 72/1268* (2013.01); *H04W 16/14* (2013.01); *H04W 72/14* (2013.01); *H04W 72/0446* (2013.01); *H04W 74/0808* (2013.01)

(58) Field of Classification Search
None
See application file for complete search history.

(56) References Cited

U.S. PATENT DOCUMENTS

| 2011/0228863 | A1* | 9/2011 | Papasakellariou | .... H04L 1/0031 |
|---|---|---|---|---|
| | | | | 375/259 |
| 2013/0016686 | A1* | 1/2013 | Li | .......... H04L 1/1822 |
| | | | | 370/329 |

(Continued)

FOREIGN PATENT DOCUMENTS

| EP | 2882249 | 6/2015 |
|---|---|---|
| WO | 2012150823 | 11/2012 |

(Continued)

OTHER PUBLICATIONS

PCT International Application No. PCT/KR2016/015381, Written Opinion of the International Searching Authority dated Apr. 7, 2017, 14 pages.

(Continued)

*Primary Examiner* — Zewdu A Beyen
(74) *Attorney, Agent, or Firm* — Lee, Hong, Degerman, Kang & Waimey PC

(57) ABSTRACT

The present invention provides a method for transmitting and receiving an uplink signal between a base station and a terminal in a licensed assisted access (LAA) system in which the base station or the terminal performs signal transmission on the basis of listen-before-talk (LBT), and an apparatus for supporting the same. More specifically, the (Continued)

present invention provides a method for transmitting an uplink signal by the base station and the terminal according to a scheduling type indicated to the terminal by the base station, and an apparatus for supporting the same.

16 Claims, 16 Drawing Sheets

Related U.S. Application Data filed on Jan. 6, 2016, provisional application No. 62/289,880, filed on Feb. 1, 2016, provisional application No. 62/316,537, filed on Mar. 31, 2016, provisional application No. 62/322,200, filed on Apr. 13, 2016, provisional application No. 62/340,016, filed on May 23, 2016, provisional application No. 62/341,061, filed on May 24, 2016, provisional application No. 62/384,731, filed on Sep. 8, 2016, provisional application No. 62/404,771, filed on Oct. 6, 2016.

(51) Int. Cl.
*H04W 16/14* (2009.01)
*H04W 72/14* (2009.01)
*H04W 72/04* (2009.01)
*H04W 74/08* (2009.01)

(56) References Cited

U.S. PATENT DOCUMENTS

2014/0153449 A1* 6/2014 Seo ............... H04L 1/1607
370/280
2016/0373233 A1* 12/2016 Pelletier ............. H04W 52/365

FOREIGN PATENT DOCUMENTS

| WO | 2014198023 | 12/2014 |
|----|------------|---------|
| WO | 2015131730 | 9/2015  |

OTHER PUBLICATIONS

Institute for Information Industry (III), "Scheduling request based on prescheduling transmission", 3GPP TSG RAN WG2 Meeting #92, R2-156244, Nov. 2015, 5 pages.

European Patent Office Application Serial No. 168820843, Search Report dated Jun. 3, 2019, 9 pages.

ZTE, "Analysis on potential issues and solutions for LAA UL transmission", 3GPP TSG RAN WG1 Ad-hoc Meeting, R1-151027, XP050951401, Mar. 2015, 6 pages.

* cited by examiner (a)

(b)

Extended UL timing

Scheduling
for HARQ process number 0

METHOD FOR TRANSMITTING AND RECEIVING UPLINK SIGNAL IN WIRELESS COMMUNICATION SYSTEM SUPPORTING UNLICENSED BAND AND APPARATUS FOR SUPPORTING SAME

CROSS-REFERENCE TO RELATED APPLICATIONS

This application is the National Stage filing under 35 U.S.C. 371 of International Application No. PCT/KR2016/015381, filed on Dec. 28, 2016, which claims the benefit of U.S. Provisional Application No. 62/273,444, filed on Dec. 31, 2015, 62/275,238, filed on Jan. 6, 2016, 62/289,880, filed on Feb. 1, 2016, 62/316,537, filed on Mar. 31, 2016, 62/322,200, filed on Apr. 13, 2016, 62/340,016, filed on May 23, 2016, 62/341,061, filed on May 24, 2016, 62/384,731, filed on Sep. 8, 2016, and 62/404,771, filed on Oct. 6, 2016, the contents of which are all hereby incorporated by reference herein in their entirety.

TECHNICAL FIELD

Following description relates to a wireless communication system supporting an unlicensed band, and more particularly, to a method of transmitting and receiving an uplink signal between a UE and a base station in a wireless communication system supporting an unlicensed band and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

An object of the present invention is to provide a method for a UE to transceive an uplink signal with a base station when the UE or the base station performs LBT (listen-before-talk)-based signal transmission.

In particular, the object of the present invention is to provide a method for a specific UE to efficiently transceive an uplink signal with a base station in an unlicensed band capable of being used by a plurality of nodes.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting and receiving an uplink signal between a user equipment and a base station in a wireless communication system supporting an unlicensed band and an apparatus therefor.

To achieve these and other advantages and in accordance with the purpose of the present invention, as embodied and broadly described, according to one embodiment, a method of transmitting an uplink signal, which is transmitted by a user equipment to a base station in a wireless communication system supporting an unlicensed band include the steps of receiving first downlink control information indicating whether a type of scheduling uplink signal transmission for one or more subframes corresponds to first type scheduling or second type scheduling from the base station, if the first downlink control information indicates the first type scheduling, transmitting an uplink signal in one or more subframes which are configured on the basis of the timing at which the first downlink control information is received, and if the first downlink control information indicates the second type scheduling, receiving second downlink control information indicating an uplink signal to be transmitted in the one or more subframes from the base station and transmitting the uplink signal in the one or more subframes which are configured on the basis of the timing at which the second downlink control information is received.

To further achieve these and other advantages and in accordance with the purpose of the present invention, according to a different embodiment, a method of receiving an uplink signal, which is received by a base station from a user equipment in a wireless communication system supporting an unlicensed band includes the steps of transmitting first downlink control information indicating whether a type of scheduling uplink signal transmission for one or more subframes corresponds to first type scheduling or second type scheduling to the user equipment, if the first downlink control information indicates the first type scheduling, receiving an uplink signal in one or more subframes which are configured on the basis of the timing at which the first downlink control information is transmitted, and if the first downlink control information indicates the second type scheduling, transmitting second downlink control information indicating an uplink signal to be transmitted in the one or more subframes to the user equipment and receiving the uplink signal in the one or more subframes which are configured on the basis of the timing at which the second downlink control information is transmitted.

To further achieve these and other advantages and in accordance with the purpose of the present invention, according to a further different embodiment, a user equipment configured to transmit an uplink signal to a base station in a wireless communication system supporting an unlicensed band includes a receiver, a transmitter, and a processor configured to operate in a manner of being connected with the receiving unit and the transmitting unit, the processor configured to receive first downlink control information indicating whether a type of scheduling uplink signal transmission for one or more subframes corresponds to first type scheduling or second type scheduling from the base station, the processor, if the first downlink control information indicates the first type scheduling, configured to transmit an uplink signal in one or more subframes which are configured on the basis of the timing at which the first downlink control information is received, the processor, if the first downlink control information indicates the second type scheduling, configured to receive second downlink control information indicating an uplink signal to be transmitted in the one or more subframes from the base station and transmit the uplink signal in the one or more subframes which are configured on the basis of the timing at which the second downlink control information is received.

To further achieve these and other advantages and in accordance with the purpose of the present invention, according to a further different embodiment, a base station configured to receive an uplink signal from a user equipment in a wireless communication system supporting an unlicensed band includes a receiver, a transmitter, and a processor configured to transmit first downlink control information indicating whether a type of scheduling uplink signal transmission for one or more subframes corresponds to first type scheduling or second type scheduling to the user equipment, the processor, if the first downlink control information indicates the first type scheduling, configured to receive an uplink signal in one or more subframes which are configured on the basis of the timing at which the first downlink control information is transmitted, the processor, if the first downlink control information indicates the second type scheduling, configured to transmit second downlink control information indicating an uplink signal to be transmitted in the one or more subframes to the user equipment and receive the uplink signal in the one or more subframes which are configured on the basis of the timing at which the second downlink control information is transmitted.

In this case, the first downlink control information can indicate a type of scheduling uplink signal transmission for the one or more subframes using an indicator of 1-bit long.

In this case, the first type scheduling may correspond to normal scheduling and the second type scheduling may correspond to triggering scheduling.

In this case, if the first downlink control information indicates the first type scheduling, the uplink signal can be transmitted and received in one or more subframes appearing after 4 subframes from the timing at which the first downlink control information is received.

And, if the first downlink control information indicates the second type scheduling, the uplink signal can be transmitted and received in one or more subframes appearing after the timing at which the second downlink control information is received from the base station.

And, if the first downlink control information indicates the second type scheduling, the uplink signal can be transmitted and received in one or more subframes appearing after the timing at which the second downlink control information is received only when the second downlink control information is received within a prescribed time period from the timing at which the first downlink control information is received.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First of all, according to the present invention, it is able to perform uplink transmission and reception between a UE and a base station according to a scheduling scheme different from a scheduling scheme of a legacy LTE system in a wireless access system supporting an unlicensed band.

Secondly, when a UE transmits and receives a signal via an unlicensed band, it may be able to minimize a case that the UE fails to transmit an uplink signal at the timing scheduled by other nodes by occupying the unlicensed band.

The above-described aspects of the present invention are merely a part of preferred embodiments of the present invention. Those skilled in the art will derive and understand various embodiments reflecting the technical features of the present invention from the following detailed description of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Mode for Invention

Figure 1:
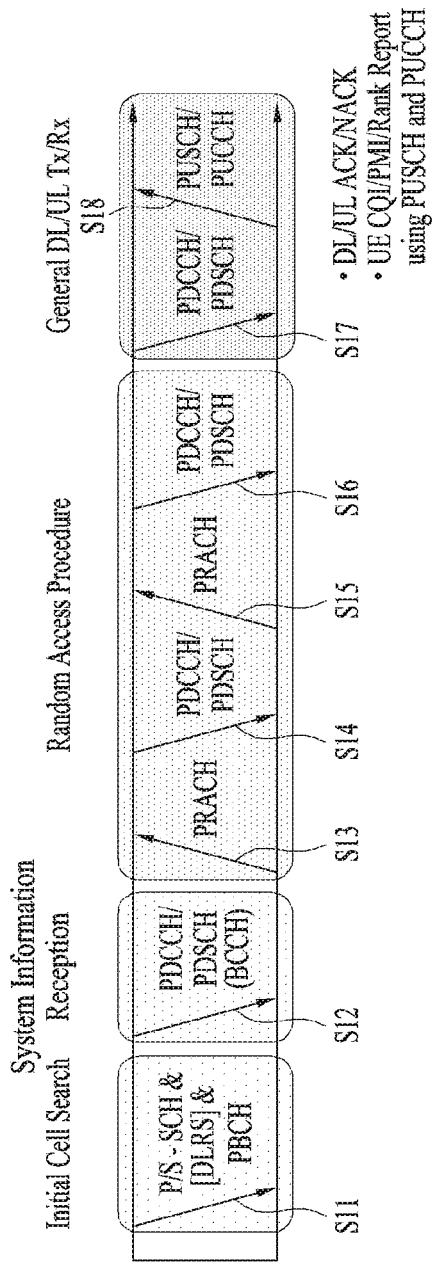
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided least it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
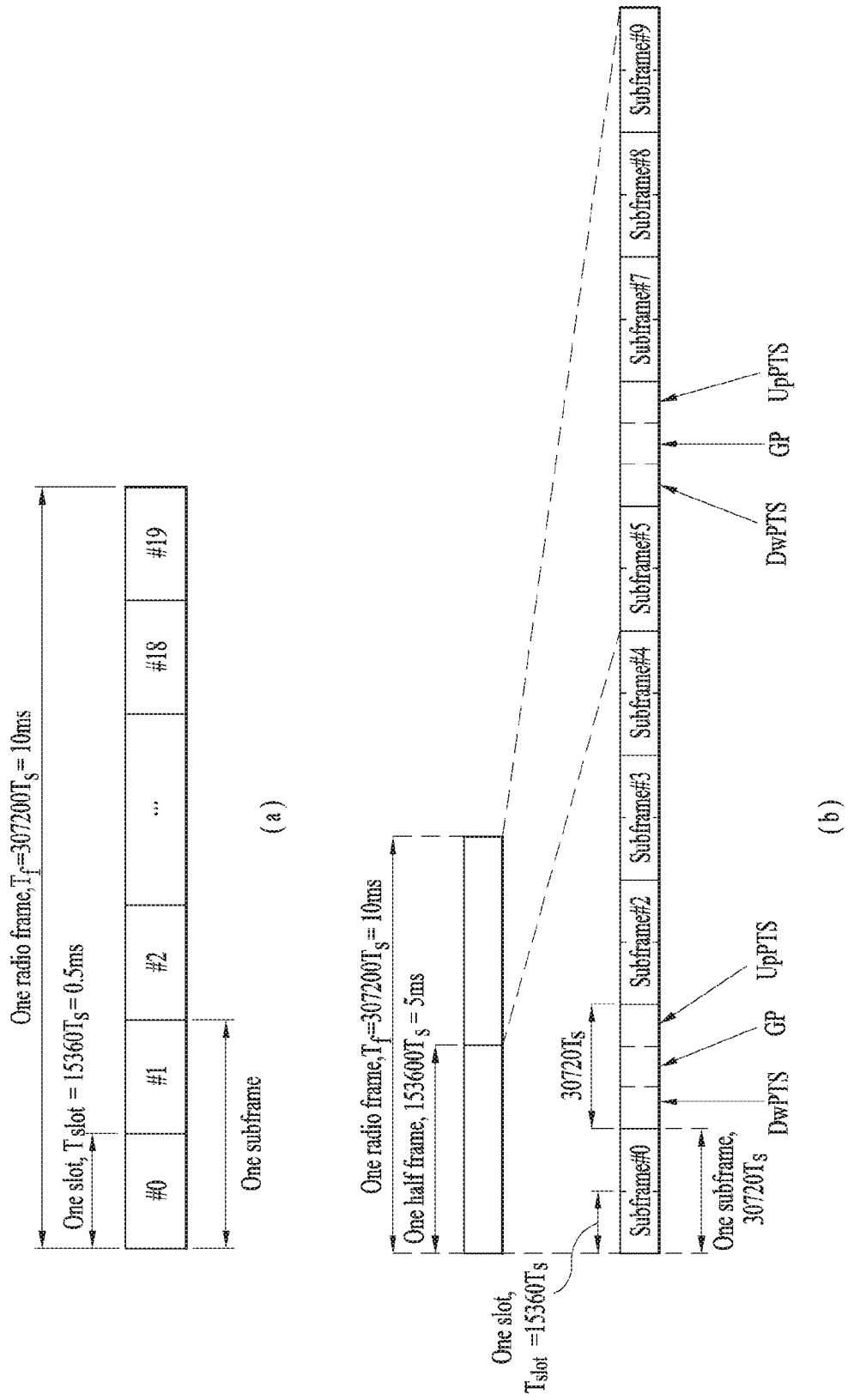
FIG. 2 is a diagram illustrating exemplary radio frame structures.

FIG. 2 illustrates exemplary radio frame structures used in embodiments of the present disclosure.

FIG. 2($a$) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
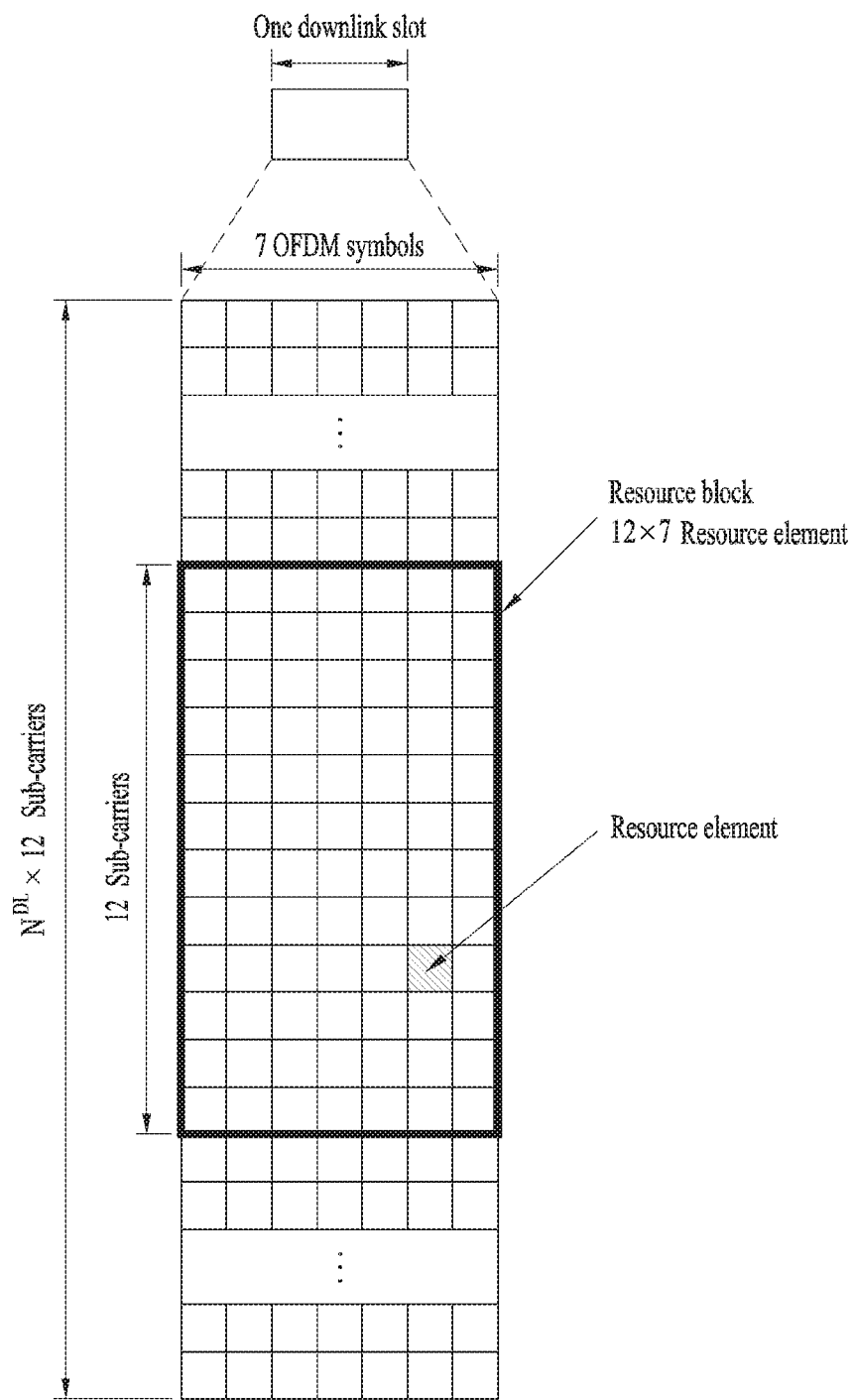
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
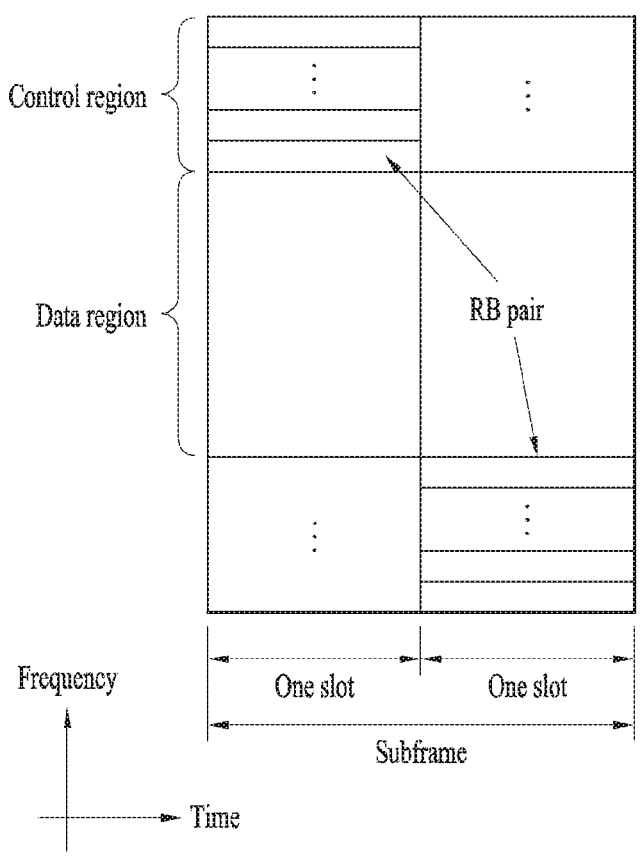
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
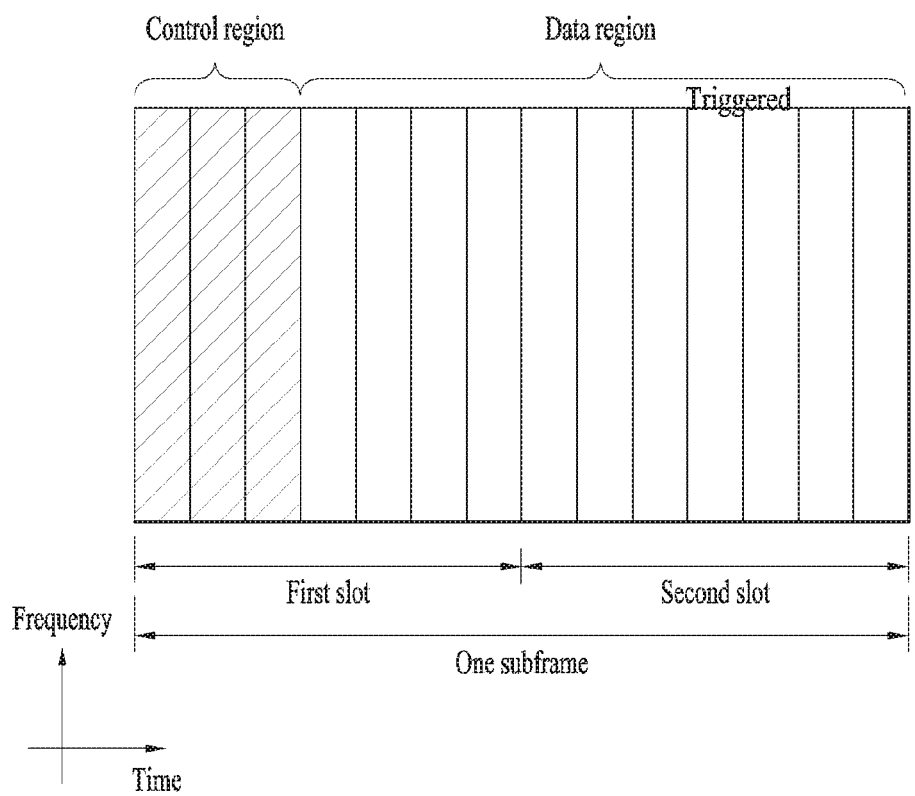
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating in an unlicensed band is referred to as LAA (licensed assisted access). Or, the LAA may correspond to a scheme of performing data transmission/reception in an unlicensed band in a manner of being combined with a licensed band.

Figure 6:
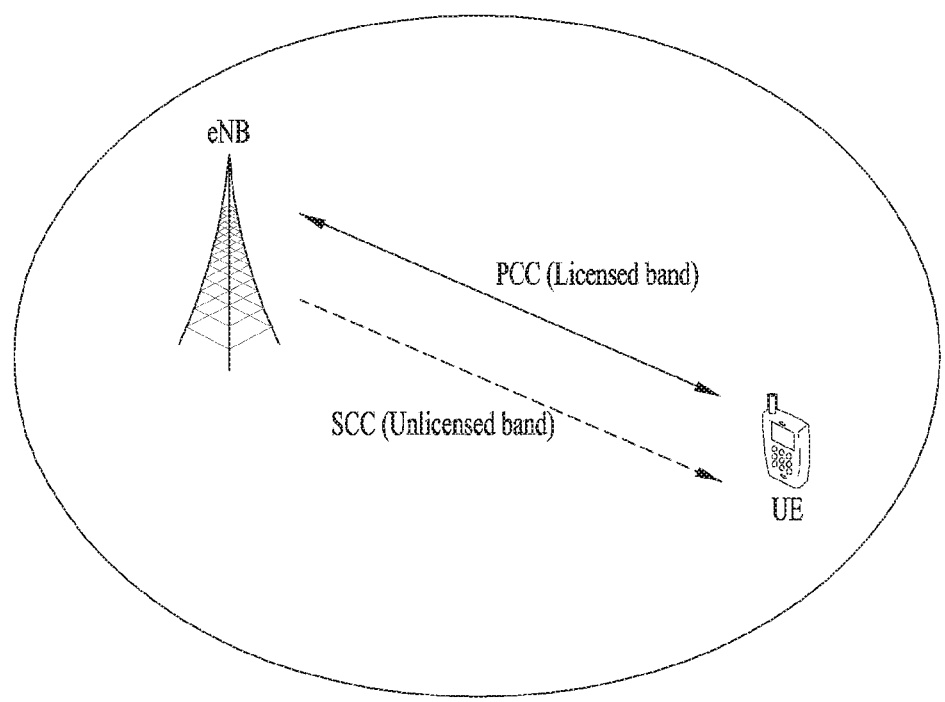
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
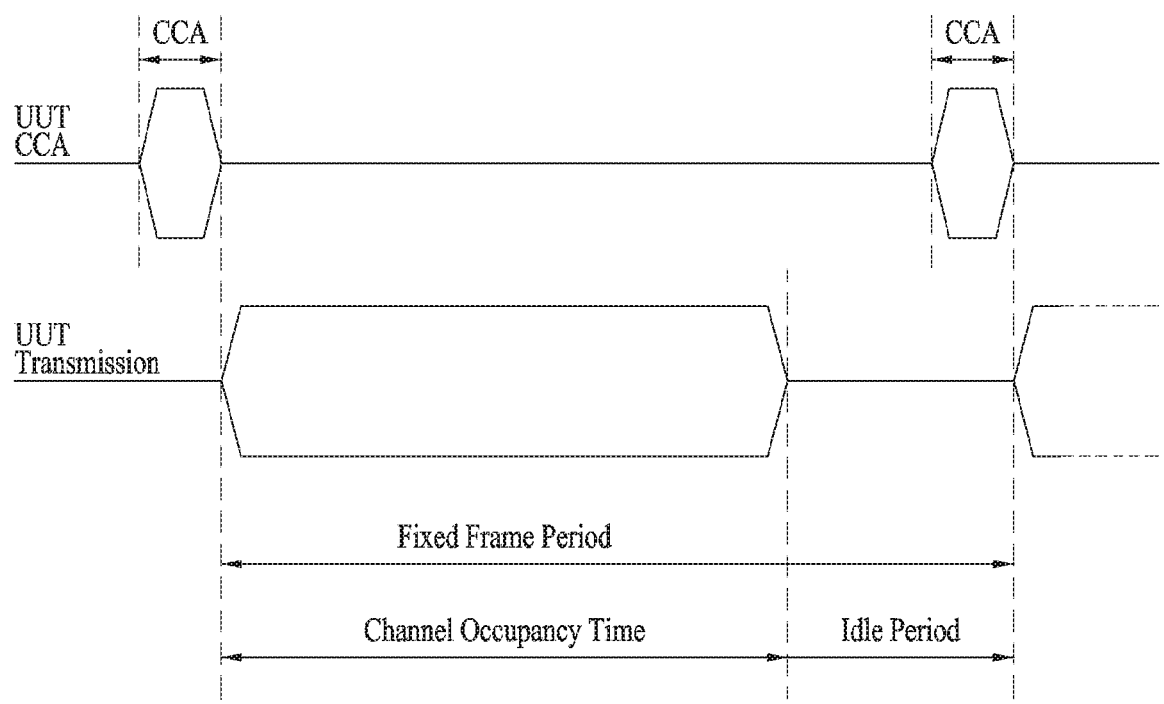
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
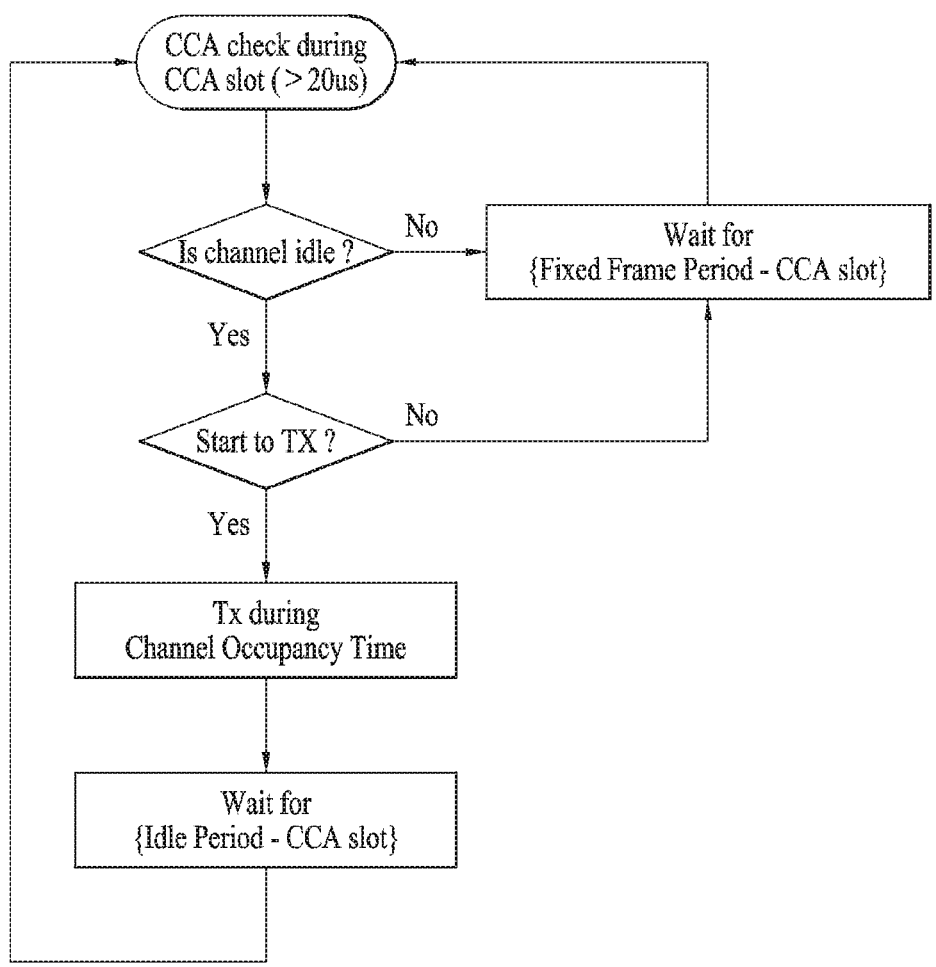
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
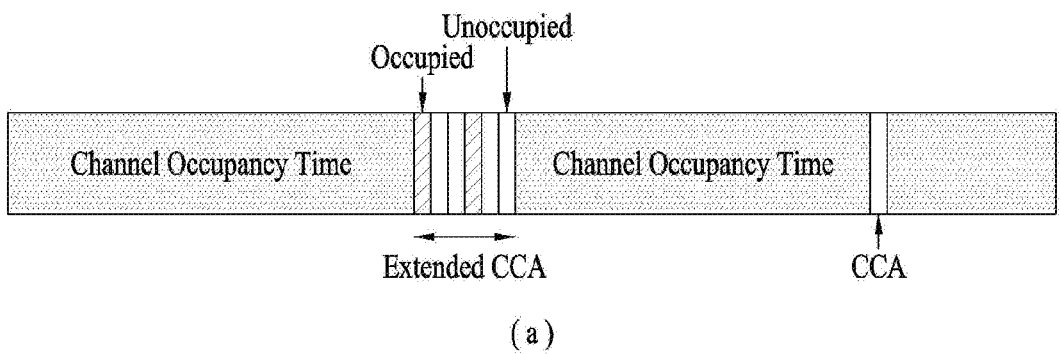
FIG. 9 is a diagram illustrating an exemplary Load Based Equipment (LBE) operation as one of the LBT operations.
Figure 9:
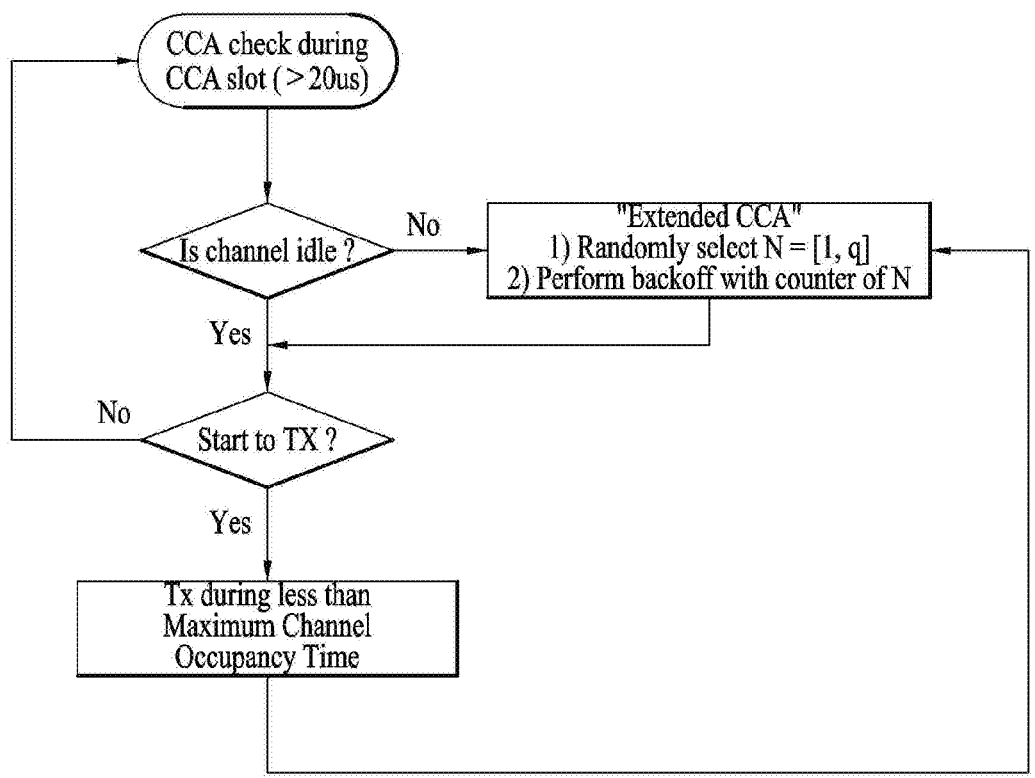

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
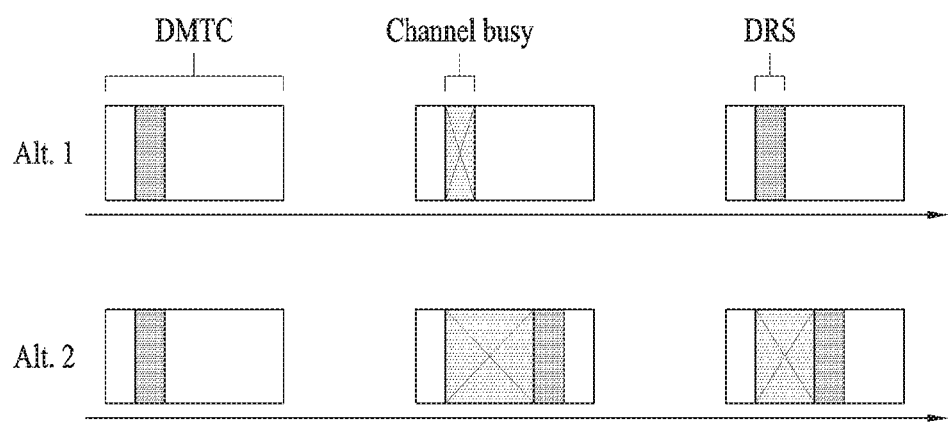
FIG. 10 is a diagram for explaining DRS transmission methods supported by LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
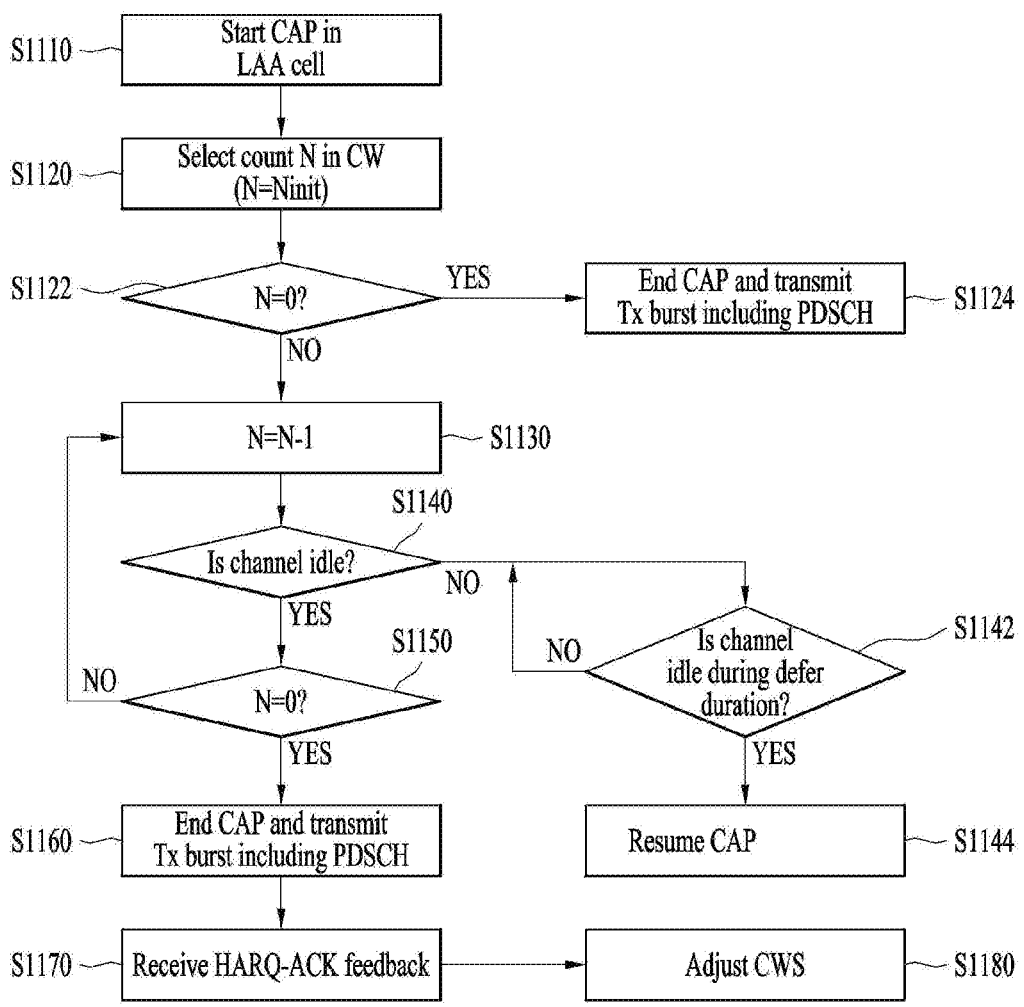
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N in a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiments

When a base station or a user equipment (UE) performs LBT-based signal transmission in a wireless communication system consisting of the base station and the UE, the present invention proposes a method of supporting available contiguous UL transmission by differently configuring transmission timing according to a TTI (transmission time interval) (or a subframe (SF)) of a UL transmission data transmitted to the base station by the UE.

A basic UL transmission structure of LAA system according to the present invention may follow a UL transmission structure of a legacy LTE system. For example, if the base station transmits DL control information (or a UL grant), which indicate UL data to be transmitted in an $n^{th}$ subframe, the UE may attempt to transmit PUSCH (physical uplink shared channel) in an $(n+L)^{th}$ subframe (e.g., L=4) according to the DL control information. In this case, due to the characteristic of the LAA system, each of the base station and the UE can perform LBT to transmit and receive the control information and the PUSCH.

Figure 12:
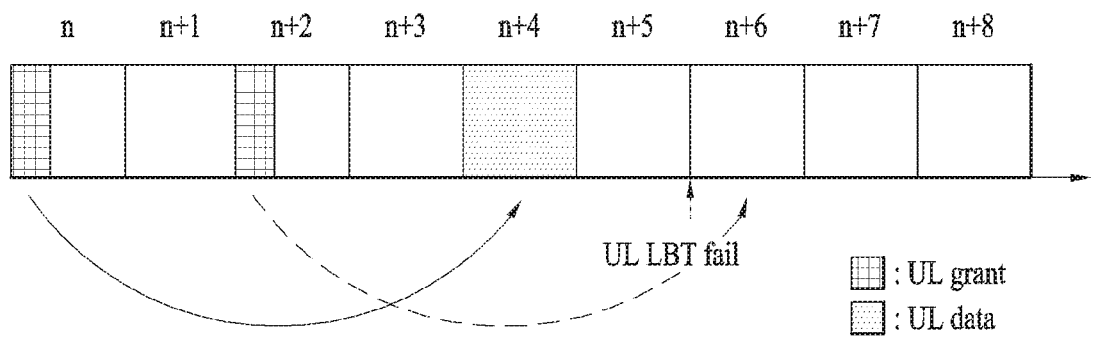
FIG. 12 is a diagram illustrating a PUSCH transmission operation of a UE in LAA system.

FIG. 12 is a diagram illustrating a PUSCH transmission operation of a UE in LAA system When L corresponds to 4.

As shown in FIG. 12, if a base station succeeds in performing DL LBT prior to an $n^{th}$ subframe, the base station transmits a UL grant, which indicates PUSCH to be transmitted in an $(n+4)^{th}$ subframe, to a UE. Having received the UL grant, the UE attempts to perform UL LBT prior to the $(n+4)^{th}$ subframe. If the UE succeeds in accessing a channel through the UL LBT, the UE can transmit the PUSCH in the $(n+4)^{th}$ subframe.

On the contrary, due to the characteristic of the LAA system, the UE may fail to perform PUSCH transmission in a corresponding subframe in response to a UL grant received from the base station. As shown in FIG. 12, although the base station performs a DL LBT operation, succeeds in accessing a channel, and transmits a UL grant in an $(n+2)^{th}$ subframe, if the UE fails to access a channel according to UL LBT prior to an $(n+6)^{th}$ subframe, the UE may fail to perform PUSCH transmission corresponding to the UL grant.

This is because, since an unlicensed band of LAA system corresponds to a band where a plurality of nodes of heterogeneous systems as well as the LAA system compete with each other for channel access via an LBT operation, as a duration between a UL grant transmitted in a specific subframe and PUSCH transmission is getting longer, it is highly probable that a channel is occupied by a different node. Hence, a probability of performing PUSCH transmission corresponding to the UL grant can be reduced.

If channel access is succeeded via an LBT operation, it may be preferable to maintain the channel access as long as possible by continuously transmitting a UL signal on the channel. In the following, for clarity, UL signal capable of being continuously transmitted by the UE within maximum COT (hereinafter, MCOT (maximum channel occupancy time)) in an unlicensed band is referred to as a UL transmission burst (UL Tx burst).

As an example applicable to the present invention, it may be able to configure a UE to perform UL transmission in contiguous subframes or transmit a UL Tx burst in a manner that a base station transmits contiguous UL grants to the UE. Yet, in the abovementioned example, transmission of the contiguous UL grants transmitted by the base station and continuous PUSCH transmission transmitted by the UE can be enabled only when both DL LBT of the base station and UL LBT of the user equipment are succeeded. Hence, the example may not be preferable in terms of implementation.

Figure 13:
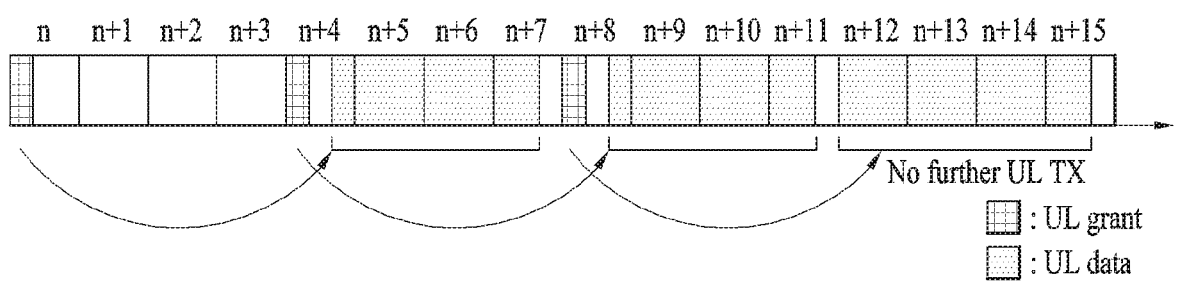
FIG. 13 is a diagram illustrating an operation of performing continuous UL transmission transmitted by a UE via multi-subframe scheduling.

Hence, it may consider multi-subframe scheduling (i.e., scheduling a plurality of subframes through a single UL grant) as a form advantageous for transmitting a UL Tx burst. FIG. 13 is a diagram illustrating an operation of performing continuous UL transmission transmitted by a UE via the multi-subframe scheduling.

As shown in FIG. 13, UL transmission including a UL grant and a partial TTI can be transmitted in a subframe (e.g., $(n+4)^{th}$ subframe, $(n+8)^{th}$ subframe) or UL transmission including a whole TTI can be transmitted in a subframe (e.g., $(n+12)^{th}$ subframe) without transmitting a separate UL grant.

Yet, in FIG. 13, since there exist subframes (e.g., $(n+1)^{th}$ subframe, $(n+2)^{th}$ subframe, $(n+3)^{th}$ subframe) in which a signal is not transmitted prior to a very first UL Tx burst, nodes of such a heterogeneous system as Wi-Fi may occupy a channel. And, as shown in FIG. 13, it may be difficult to apply an operation of performing UL transmission in the remaining subframes except the subframes in which a UL grant is transmitted to a case that COT of the UL Tx burst is equal to or greater than 4 TTIs (or 4 subframes). For example, a case of FIG. 4 is explained in the following.

Figure 14:
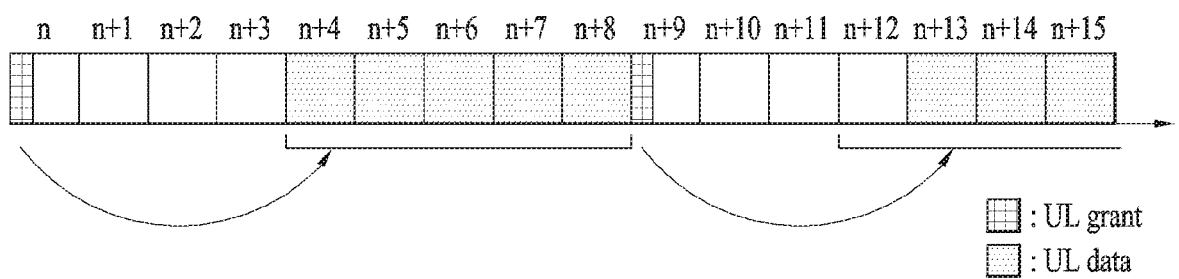
FIG. 14 is a diagram illustrating an operation when COT of a UL transmission burst corresponds to 5 TTI.

FIG. 14 is a diagram illustrating an operation when COT of a UL transmission burst corresponds to 5 TTI.

As shown in FIG. 14, an interval between the timing at which a specific UL grant is received and the timing at which PUSCH corresponding to the UL grant is transmitted corresponds to 4 TTIs (or 4 subframes). In this case, if a maximum length of a UL Tx burst is configured by 5 TTIs (or 5 subframes), it is unable to perform the contiguous PUSCH transmission shown in FIG. 13. Hence, it may have a case that there is a restriction on the maximum length of the UL Tx burst.

In order to solve the abovementioned problem, the present invention proposes a method of supporting a UE to perform UL transmission as continuous as possible.

In the following, for clarity of explaining operations of the present invention, when a base station transmits a UL grant to a UE in an $n^{th}$ subframe and the UE, which has received the UL grant, attempts to transmit PUSCH in an $(n+N_0)^{th}$ subframe, the operation is defined as an operation based on a reference UL timing (or legacy UL timing). In this case, the $N_0$ value can be promised in advance between the base station and the UE or can be configured via an RRC (radio resource control) signal.

In this case, the UL grant can be transmitted in a form of DL control information.

In the following, various modification examples of the present invention are proposed. All of the modification examples can be applied together except the items incapable of coexisting.

3.1 Embodiment 1

A base station informs a UE of information on whether or not PUSCH is transmitted in each subframe of L (L≥1) number of contiguous subframes and information on an order (e.g., $I_0^{th}$) of a subframe to which reference UL timing is applied among the L number of subframes through a UL grant. The UE applies a time offset for transmission timing to the remaining $I_1^{th}$ subframe as much as $K*(I_0-I_1)$ number of TTIs (or subframes).

In this case, the L and the K can be promised in advance between the base station and the UE or the base station can set the L and the K to the UE via higher layer signaling such as RRC and the like. Or, the base station may forward the L and the K to the UE through a dynamic control signal.

In LTE system, if a TDD configuration 0 is configured, a case that 2 DL subframes exist only in response to 3 UL subframes may occur. Hence, the present invention proposes a method of scheduling PUSCH transmission for 2 UL subframes in a single DL subframe in the LTE system. Specifically, a base station includes a UL index of 2-bit long in a UL grant and can schedule PUSCH transmission for the 2 UL subframes according to a value of the UL index. For example, if the subframe index corresponds to '00', it may indicate that transmission is not performed in the 2 UL subframes. If the subframe index corresponds to '10', it may indicate that transmission is performed in the first UL subframe. If the subframe index corresponds to '01', it may indicate that transmission is performed in the second UL subframe. If the subframe index corresponds to '11', it may indicate that transmission is performed in the 2 UL subframes.

If the abovementioned configuration is extended to multi-subframe scheduling, the base station can inform the L number of contiguous subframes of whether or not PUSCH is transmitted in each subframe via a single UL grant. In this case, if it is expected that UE processing delay is small, the base station can indicate PUSCH transmission to be performed in a subframe that follows UL timing (i.e., fast UL timing) faster than reference UL timing. More specifically, if conditions described in the following are satisfied, the base station can indicate the UE to perform PUSCH transmission following the fast UL timing.

(1) A UE of TA (timing advance) equal to or less than a specific value. To this end, the UE can report a UL TA value to the base station. And, if TA of a specific UE is equal to or greater than a specific value, the specific UE can ignore a UL grant indicating the fast UL timing.

(2) A UE capable of supporting fast UL timing in UE processing capability.

(3) PUSCH that a transport block (TB) size is equal to or less than a specific value (4) PUSCH corresponding to a PDCCH-based UL grant. Additionally, it may not apply the PUSCH to EPDCCH (enhanced physical control channel) proposed by LTE-A system. Or, the PUSCH can be applied in a manner of being differentiated from a PDCCH case.

(5) PUSCH for retransmission (6) SPS (semi-persistent scheduling)-based PUSCH

The base station can provide fast UL timing corresponding to a specific UL grant to the UE using various methods. For example, the base station can directly indicate a subframe in which PUSCH is transmitted according to the fast UL timing. Or, the base station can indicate a subframe following the reference UL timing to make the UE indirectly know a subframe in which PUSCH is transmitted according to the fast UL timing.

The fast UL timing applied to the UE may have a different value depending on a TA value of the UE. For example, if a TA value of a UE approaches to 0, it may apply 3 ms (in general, k TTIs) as the fast UL timing. Otherwise, it may apply 4 ms (in general, k TTIs+ceil (max_TA/TTI duration)). In this case, the ceil (K) corresponds to a minimum integer value equal to or greater than a K value.

Figure 15:
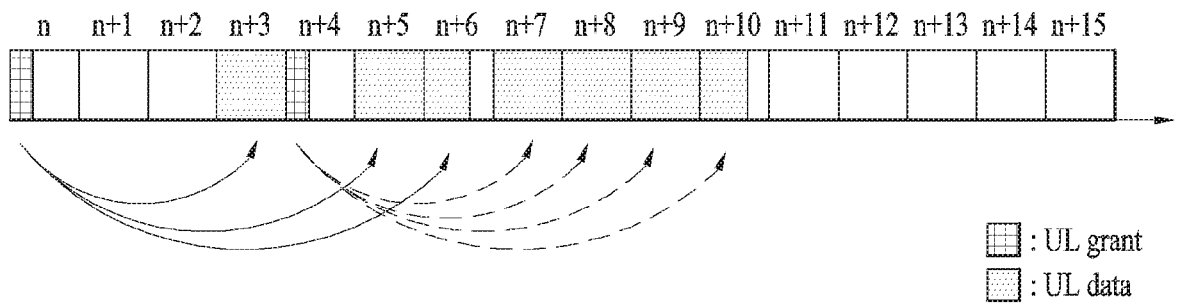
FIG. 15 is a diagram illustrating an operation of a single UL grant indicating PUSCH transmission in a plurality of subframes according to fast UL timing.

FIG. 15 is a diagram illustrating an operation of indicating PUSCH transmission in a plurality of subframes according to fast UL timing via a single UL grant.

As shown in FIG. 15, a base station can transmit a UL grant to a UE in an $n^{th}$ subframe and an $(n+4)^{th}$ subframe. In this case, the base station indicates PUSCH to be transmitted in an $(n+3)^{th}$, an $(n+5)^{th}$, and an $(n+6)^{th}$ subframe in response to the UL grant transmitted in the $n^{th}$ subframe. The base station may not indicate PUSCH to be transmitted in an $(n+4)^{th}$ subframe. And, the base station can indicate PUSCH to be) transmitted in an $(n+7)^{th}$, an $(n+8)^{th}$, an $(n+9)^{th}$, and an $(n+10)^{th}$ subframe in response to the UL grant transmitted in the $(n+4)^{th}$ subframe. By doing so, as shown in FIG. 15, the base station can support contiguous UL transmissions of the UE.

Whether or not the fast UL timing is applied can be indicated via RRC configuration. If it is configured not to apply the fast UL timing, a bit field of reference UL timing can be omitted from a UL grant. In case of UE incapable of supporting the fast UL timing, e.g., in case of a UE including a TA value equal to or greater than a prescribed value or a UE incapable of supporting the fast UL timing in UE processing capability, the UE can omit transmission in subframes following the fast UL timing among a plurality of subframes in multi-subframe scheduling indicated by the base station.

And, if the base station indicates PUSCH transmission incapable of being supported by the fast UL timing, the UE may omit a corresponding UL transmission.

As an additional variation example, the base station can inform the UE of information on whether or not PUSCH is transmitted in each subframe of L (L≥1) number of subframes and information on a duration of a time offset between UL timing applied to a first subframe among the L number of subframes and reference UL timing. In this case, it may be able to configure UL transmission timing applied to the remaining subframes to be linearly increased compared to the transmission timing applied to the first subframe.

Additionally, if the base station differently applies UL timing according to a TA value per UE, the base station and the UE may differently recognize a maximum TA value according to a TTI length. For example, if the TTI length is short, the base station or the UE can configure the maximum TA value to be small as well. In particular, the maximum TA value can be configured in proportion to the TTI length.

More specifically, in order to match UL synchronization among a plurality of UEs related to the same serving cell, each of a plurality of the UEs transmits a UL channel of the UE in advance as much as prescribed time from a DL TTI (e.g., subframe) boundary in consideration of a TA command. For example, if a distance between a UE and the serving cell corresponds to 100 km, a TA value for the UE may correspond to 0.67 ms (=2*100 km/(3*10$^8$ m/s)). A time period between (E)PDCCH/PDSDCH and PUCCH/PUSCH is used for performing timing adjustment and a decoding/encoding process of a physical channel. In other word, as a radius of a target cell is getting bigger, HARQ process delay or a difference of time taken for receiving PUSCH from a UL grant is increasing.

In particular, since a short TTI has a merit in reducing HARQ process delay and RTT (round trip time), it is preferable to use the short TTI in reducing time taken for timing adjustment and/or processing. Hence, it may consider a method that a UE assumes that a maximum TA value is proportional to a TTI length. For example, if 1 TTI corresponds to 7 symbols, the maximum TA value may correspond to 0.33 ms (cell radius corresponds to 50 km). If 1 TTI corresponds to 3 or 4 symbols, the maximum TA value may correspond to 0.16 ms (cell radius corresponds to 24 km). If 1 TTI corresponds to 2 symbols, the maximum TA value may correspond to 0.093 ms (cell radius corresponds to 14 km). If 1 TTI corresponds to 1 symbol, the maximum TA value may correspond to 0.047 ms (cell radius corresponds to 7 km).

Since 5%-tile UPT (user packet throughput) property (e.g., data throughput of cell boundary UE (or user) is decreased in accordance with the decrease of a TTI length, it may be preferable to reduce the maximum TA value for a short TTI. While TA is updated, a TA value accumulated for a given TTI length may become greater than the maximum TA value. In this case, a UE may abandon UL channel transmission for UL/DL transmission or may change the TTI length. In particular, according to the present invention, it may be able to reduce the total processing time for a short TTI by configuring the maximum TA value in proportion to a TTI length.

3.2 Embodiment 2

The base station provides a single UE grant to the UE to provide information on the number (M) of subframes in which PUSCH transmission is not performed and information on positions (e.g., $_LC_M$) of the subframes in which PUSCH transmission is not performed among the L (L≥1) number of contiguous subframes.

In this case, the L and the M can be promised in advance between the base station and the UE or the base station can inform the UE of the L and the M via higher layer signaling such as RRC and the like. Or, the base station may forward the L and the M to the UE through a dynamic control signal.

As mentioned earlier in the embodiment 1, a method of indicating information on whether or not PUSCH is transmitted in each subframe of the L number of contiguous subframes can perform a most flexible operation. However, the method has a demerit in that control signaling overhead is high. If it is assumed that COT corresponds to 8 subframes in LAA system, according to the embodiment 1, a bit field of 8-bit long should be included in a UL grant.

The embodiment 2 proposes a method of reducing control signaling overhead. In particular, if it is assumed that the number of subframes in which PUSCH transmission is not performed corresponds to 1 among 8 (i.e., L=8) subframes (i.e., M=1), the base station can inform the UE of position information of the subframe in which the PUSCH transmission is not performed using 3 ((=log 2(8)) bits. Since it is preferable to perform transmission in a unit of a UL TX burst in the LAA system, the abovementioned configuration can be matched with a configuration that the number of subframes in which PUSCH transmission is not performed is configured to be small.

For example, assume that L=4 and M=1 are configured and a bit field of 2-bit long included in a UL grant indicates a second subframe as a subframe in which PUSCH transmission is not performed among 4 subframes. In this case, if the aforementioned configuration is utilized, as shown in FIG. 15, it may be able to support continuous UL transmission of the UE.

Figure 16:
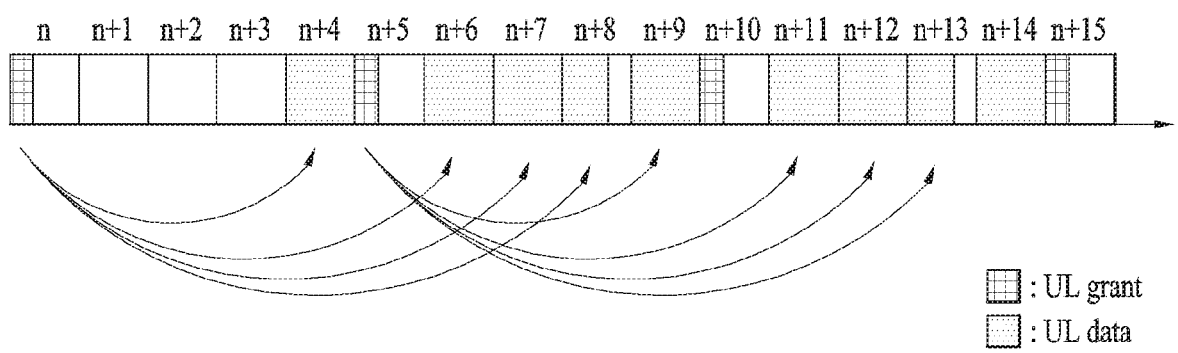
FIG. 16 is a diagram illustrating an operation of a single UL grant indicating PUSCH transmission in subframes except a second subframe among 4 contiguous subframes.

FIG. 16 is a diagram illustrating an operation of a single UL grant indicating PUSCH transmission in subframes except a second subframe among 5 contiguous subframes.

As shown in FIG. 16, a base station can indicate PUSCH transmission transmitted in an $(n+4)^{th}$, an $(n+6)^{th}$, an $(n+7)^{th}$, and an $(n+8)^{th}$, subframe through a UL grant transmitted in an $n^{th}$ subframe. Subsequently, the base station can indicate PUSCH transmission transmitted in an $(n+9)^{th}$, an $(n+11)^{th}$, an $(n+12)^{th}$, and $(n+13)^{th}$, and an $(n+14)^{th}$ subframe through a UL grant transmitted in an $(n+5)^{th}$ subframe. By doing so, the UE can continuously perform PUSCH transmission.

In this case, if a first subframe is included in the subframes in which PUSCH transmission is not performed, the case can be excluded. A specific state indicated by the bit field, which indicates the position information of the subframes in which the PUSCH transmission is not performed, may indicate that there is no subframe in which the PUSCH transmission is not performed among a plurality of subframes. In other word, the specific state may indicate that the PUSCH transmission is performed in all of a plurality of the subframes.

The UE can perform monitoring for DL control signaling on the subframes in which the PUSCH transmission is not performed indicated by the base station. In this case, whether or not a partial subframe is applied in an adjacent UL subframe can be determined on the basis of a monitoring target subframe of the DL control signaling indicated by the base station. For example, an ending partial subframe can be applied in a UL subframe immediately before the DL control signaling target subframe.

Additionally, if the UE monitors DL control signaling in the subframes in which the PUSCH transmission is not performed to receive a new UL grant and the received UL grant indicates not to perform PUSCH transmission on an already scheduled UL subframe, the UE can determine whether or not PUSCH is transmitted in a corresponding subframe and transmission contents according to the content indicated by a most recently or lately received UL grant.

3.2.1 Additional Embodiment 1

A base station configures subframes in which a UE monitors a DL signal in advance and indicates the UE to transmit PUSCH in the L (L≥1) number of contiguous subframes via a single UL grant. In this case, the UE interprets the abovementioned operation as follows and can perform a corresponding operation.

(1) The UE can interpret the UL grant as scheduling information on the L number of contiguous subframes from a first UL transmission timing indicated by the UL grant. In this case, if a subframe in which a DL signal is monitored is included in the L number of subframes, the UE may omit PUSCH transmission in the subframe.

(2) The UE can interpret the UL grant as scheduling information on the L number of subframes except subframes in which the DL signal is monitored from a first UL transmission timing indicated by the UL grant.

For example, referring to FIG. 16, the base station can configure the UE to monitor DL control signaling in an $n^{th}$ subframe, an $(n+5)^{th}$ subframe, an $(n+10)^{th}$ subframe, an $(n+15)^{th}$ subframe, etc. If the base station performs multi-subframe scheduling on 5 subframes via a UL grant in the $n^{th}$ subframe, it may expect that the UE transmits PUSCH in an $(n+4)^{th}$ subframe, an $(n+5)^{th}$ subframe, an $(n+6)^{th}$ subframe, an $(n+7)^{th}$ subframe, and an $(n+8)^{th}$ subframe on the basis of the timing at which the UL grant is received. In this case, since the UE is already configured to monitor DL control signaling in the $(n+5)^{th}$ subframe, PUSCH transmission scheduled in the $(n+5)^{th}$ subframe can be omitted.

3.2.2 Additional Embodiment 2

A base station configures subframes in which a DL signal is monitored in advance via a higher layer signaling and indicates the subframes to be activated or deactivated using common signaling (e.g., common DL control information (DCI)). Or, the base station can indicate one of a plurality of configurations for the subframes in which the DL signal is monitored.

For example, when the base station performs self-carrier scheduling in environment where traffic load is less and UL traffic exists only, the base station can indicate the activation of the subframes in which the DL signal is monitored to inform a UE of DL subframes in which a UL grant is to be transmitted. In particular, the base station sets a configuration to the subframe in which the DL signal is monitored using a period and an offset and can inform the UE of information on whether or not the configuration is currently applied via common DCI and the like.

Additionally, the base station sets a plurality of configurations (i.e., a different period and offset) to the subframe in which the DL signal is monitored and can indicate one of a plurality of the configurations via common DCI, and the like.

3.2.3 Additional Embodiment 3

A base station can indicate a subframe in which a future DL signal is to be monitored via common signaling (e.g., common DCI).

The above method corresponds to a very dynamic method. The base station can inform a UE of an anticipated position to which a next DL signal is to be transmitted via common DCI. More specifically, the base station can inform the UE of a position of a subframe in which a next DL signal is to be transmitted in a form of a time offset.

3.2.4 Additional Embodiment 4

When the base station configures a subframe in which a DL signal is monitored via one of the aforementioned additional embodiments, the base station or the UE can apply a Tx gap to a fore part of a DL subframe (the subframe in which the DL signal is monitored) or a rear part of a subframe immediately before the DL subframe.

If PDCCH and the like are transmitted in the subframe in which the DL signal is monitored according to a DL LBT operation, it is necessary to configure a TX gap for the DL LBT operation. Hence, if the subframe in which the DL signal is monitored is configured by the base station, although there is no separate signal, the UE can set a Tx gap to a fore part (e.g., all or a part of a first slot) of the DL subframe or a rear part (e.g., all or a part of a second slot) of a subframe immediately before the DL subframe.

3.2.5 Additional Embodiment 5

When a base station indicates a UE to perform multi-subframe scheduling on L (L≥1) number of subframes via a single UL grant, the base station indicates a transmission timing offset value compared to a previous subframe according to a subframe as information on transmission timing of each subframe using the UL grant.

For example, when the base station indicates the UE to perform multi-subframe scheduling on 4 subframes via a single UL grant, as shown in FIG. 16, it may be able to configure a time period capable of transmitting a UL grant within the L number of subframes.

As a method of configuring the time period, as mentioned earlier in the embodiment 2, it may indicate the M number of subframes in which actual PUSCH transmission is not performed among the L number of subframes. As a different method of configuring the time period, it may be able to indicate a transmission timing offset value between subframes to implement the time period. In particular, a specific bit field of a UL grant can indicate a time axis offset value compared to the timing at which an $(t-1)^{th}$ subframe is transmitted for a random t(t>1) subframe among the L number subframes.

For example, the offset value can be configured in a subframe unit. In the aforementioned example of 4 subframes, the base station indicates a first subframe to follow the transmission timing indicated by the UL grant and indicates the remaining 3 subframes to have +0 subframe compared to a previous subframe and a transmission timing offset value of +1 subframe according to each subframe via an indicator of 1-bit long.

3.2.6 Additional Embodiment 6

When a base station indicates a UE to perform multi-subframe scheduling on the L (L≥1) number of subframes via a single UL grant, the base station can indicate a position to which blank subframes (or blank time duration) having a predetermined length (or a length configured via higher layer signaling) are inserted using the UL grant.

In this case, the UE may expect DL reception (or at least UL grant reception) for the blank subframes.

For example, when the base station indicates the UE to perform multi-subframe scheduling on 4 subframes via a single UL grant, as shown in FIG. 16, it may configure a space for transmitting a UL grant among the L number of subframes. In this case, the base station can support the space for transmitting the UL grant in a manner of inserting a blank subframe to the L number of subframes.

More specifically, if the base station configures a blank subframe defined by a subframe and indicates a subframe from among the L number of subframes, the blank subframe can be inserted after the subframe indicated by the base station.

In this case, the blank subframe can be inserted into two or more positions. For example, when 4 subframes are scheduled, the base station may indicate the blank subframe to be inserted into a position immediately after a first subframe and a position immediately after a second subframe, respectively. The UE may expect DL reception for the blank subframe.

The abovementioned configuration is more generally explained. The base station can indicate the UE that K blank subframes are respectively inserted into M number of positions among the L number of subframes via a UL grant. In this case, the M and the K may correspond to values configured via higher layer signaling, the values indicated by a dynamic control signal, or the values promised in advance between the base station and the UE.

3.3. Embodiment 3

When a base station informs a UE of information on whether or not PUSCH transmission is performed in the L (L≥1) number of subframes via a single UL grant, the UL grant indicates whether the scheduling performed on the L number of subframes corresponds to pre-scheduling or general scheduling.

As mentioned in the foregoing description, the UL grant can be transmitted in a form of downlink control information (DCI).

Specifically, in order to indicate a scheduling scheme performed on the L number of subframes, it may apply an indicator of 1 bit-long. It may be able to indicate 'pre-scheduling' or 'general scheduling' according to a value of the indicator. In this case, the 'pre-scheduling' scheme can be interpreted as a meaning identical to 'triggered scheduling'.

Or, it may be able to indicate the specific M number of subframes among the total L number of subframes through a predetermined scheme, an RRC signaling scheme, or a bit field included in a UL grant.

In this case, subframes to which transmission timing faster than reference UL timing is set can be applied as pre-scheduling target subframes. The base station can configure information on whether or not the UE interprets a specific subframe set as a pre-scheduling target via higher layer signaling such as RRC and the like. Or, the information can be indicated by a bit field included in the UL grant.

In the following description, the meaning of 'pre-scheduling' proposed by the present invention may correspond to a series of operations of the UE. In particular, while the UE postpones data transmission in response to a recently received UL grant, if transmission of pre-scheduled data is indicated via a separate indication (e.g., a UL grant received after the recently received UL grant), the UE prepares transmission according to fast UL timing from the indicated timing.

In other word, the pre-scheduling proposed by the present invention may correspond to an operation that (partial) scheduling information for generating data is indicated to the UE when PUSCH is transmitted, whereas transmission timing of the PUSCH is not indicated to the UE. Hence, if the pre-scheduling is indicated to the UE, the UE generates PUSCH to be transmitted in advance and postpones PUSCH transmission until the transmission timing indicated by the base station. In this case, triggering DCI may correspond to DCI that indicates actual transmission (at specific timing) of the pre-scheduled PUSCH.

Figure 17:
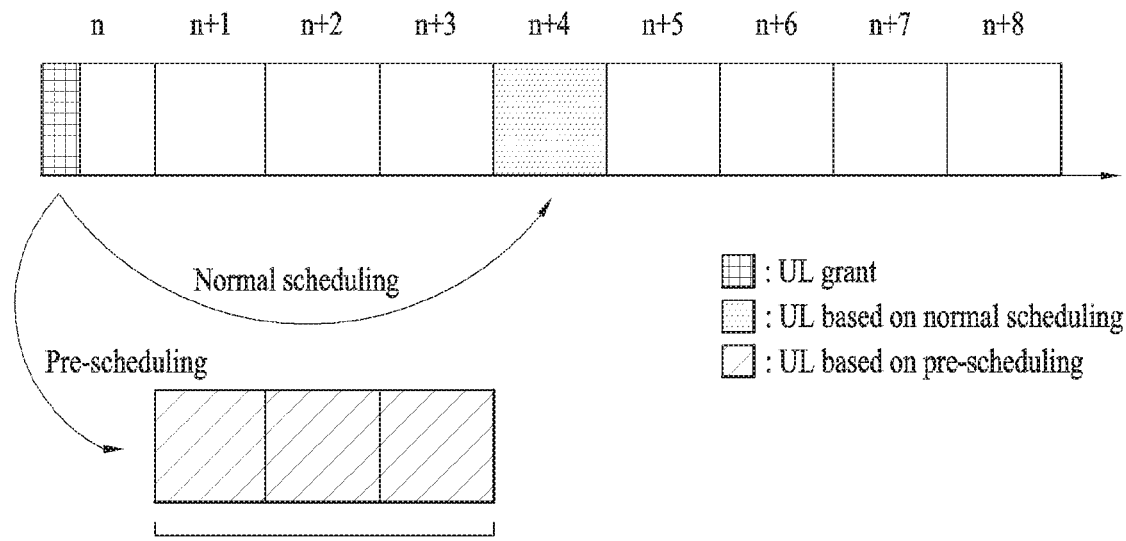
FIG. 17 is a diagram illustrating an operation of performing pre-scheduling on a partial subframe via a UL grant.

For example, assume that the base station indicates the UE to perform transmission in an $(n+1)^{th}$ subframe, an $(n+2)^{th}$ subframe, an $(n+3)^{th}$ subframe, and an $(n+4)^{th}$ subframe in response to a UL grant transmitted in an $n^{th}$ subframe and the UE is configured to interpret subframes of which transmission timing is faster than reference UL timing as pre-scheduling target subframes. In this case, as shown in FIG. 17, the UE does not perform actual transmission in the $(n+1)^{th}$ subframe, the $(n+2)^{th}$ subframe, and the $(n+3)^{th}$ subframe and generates a transport block (TB) to prepare transmission.

The aforementioned characteristic can be generally summarized as follows. When a multi-subframe scheduling target corresponds to the L number of subframes, the base station can indicate a scheduling type for the total L number of subframe or the specific M number of subframes among the L number of subframes. In addition, when the base station informs the UE of pre-scheduling information only via a UL grant, the base station can include an indicator in the UL grant to indicate information on whether the UL grant indicates pre-scheduling or actual PUSCH transmission. Or, the base station may allocate separate HARQ processes for the pre-scheduling. Then, the UE is able to know whether the UL grant is used for actual PUSCH transmission or pre-scheduling for future PUSCH transmission via a HARQ process index included in the UL grant.

For example, assume that the base station transmits the UL grant in an $n^{th}$ subframe. In this case, if the UL grant indicates a general scheduling usage (or non-pre-scheduling usage) for the N number of subframes, the UE transmits a UL signal (e.g., PUSCH) corresponding to the UL grant to the base station after prescribed time elapsed (e.g., $(n+4)^{th}$ subframe) from the timing at which the UL grant is received.

Or, if the UL grant indicates a pre-scheduling usage for the N number of subframes, the UE receives a UL grant (e.g., triggering DCI) for triggering transmission of a pre-scheduled UL signal and transmits a UL signal corresponding to the received UL grant to the base station.

In the following, additional embodiments of the present invention are explained in detail.

3.3.1 Additional Embodiment 1

A base station indicates a UE to prepare initial transmission for specific UL data and prepare retransmission at the same time via a single UL grant. Subsequently, the base station can indicate whether or not retransmission data prepared by the UE is actually transmitted using separate triggering DCI.

In this case, transmission timing of the retransmission data prepared by the UE can be determined by applying fixed UL timing (or UL timing configured by the base station using a higher layer signal) on the basis of the timing at which the triggering DCI is received (or the timing at which the UL grant is received or the initial transmission timing).

In this case, an RV (redundancy version) for the retransmission data can be determined by applying a fixed offset (or an offset configured by the base station using a higher layer signal) to an RV indicated to the initial transmission.

More specifically, the base station can indicate the UE to perform initial transmission scheduling on a specific UL data and indicate the UE to prepare retransmission of the data at the same time via a single UL grant. In this case, when the base station transmits the UL grant to the UE in an $n^{th}$ subframe and the UE performs initial transmission in an $(n+4)^{th}$ subframe, if the base station fails to demodulate the data transmitted by the UE, the base station can indicate the UE to transmit the retransmission prepared by the UE at faster UL timing.

For example, the base station transmits triggering DCI to the UE in an $(n+5)^{th}$ subframe to indicate the UE to transmit the retransmission data prepared by the UE in an $(n+6)^{th}$ subframe. In this case, although UL scheduling delay corresponding to 4 subframes is considered for initial transmission, since the retransmission is prepared in advance, it may consider less UL scheduling delay corresponding to 1 subframe for the retransmission.

Or, in case of synchronous HARQ, the base station can configure a single UL grant transmitted to the UE to be comprehended as a meaning of transmitting a data according to scheduling and performing non-adaptive retransmission preparation for the data (via a higher layer signal, etc.). In this case, the UE can transmit the non-adaptive retransmission data by applying UL timing (e.g., receives data in an $n^{th}$ subframe and transmits the data in $(n+2)^{th}$ subframe) faster than normal UL timing (e.g., receives data in an $n^{th}$ subframe and transmits the data in $(n+4)^{th}$ subframe) to the timing at which PHICH of the base station is received.

3.3.2 Additional Embodiment 2

A base station indicates a UE to perform initial transmission of a specific UL data via a UL grant among a plurality of UL grants (for the same UE) belonging to the same subframe and indicates the UE to prepare retransmission of the UL data via a different UL grant(s). Subsequently, the base station can indicate whether or not the retransmission data prepared by the UE is actually transmitted via separate triggering DCI.

In this case, transmission timing of the retransmission data prepared by the UE can be determined by applying a fixed UL timing (or UL timing configured by the base station using a higher layer signal) on the basis of the timing at which the triggering DCI is received (or the timing at which the UL grant indicating the preparation of the retransmission is received, or initial transmission timing). Or, a UL signal can be transmitted according to timing which is configured after the timing at which the triggering DCI is received.

According to the additional embodiment 1, if the initial transmission preparation and the retransmission preparation are indicated by the same UL grant, since single scheduling information is applied, the degree of freedom in scheduling retransmission can be reduced. Hence, in order to more increase the degree of freedom of scheduling of the base station, the additional embodiment 2 proposes a method of transmitting a UL grant for indicating initial transmission and a separate UL grant for indicating preparation of retransmission, respectively.

In this case, when the UE fails to perform initial transmission, in order for the base station to quickly indicate the UE to prepare retransmission, it is necessary for the base station not only to indicate the initial transmission but also to make the UE prepare retransmission. To this end, the base station transmits a UL grant for indicating the initial transmission and a UL grant for indicating preparation of retransmission in the same subframe and the UE may expect that the UL grants of two purposes are received in one subframe.

3.3.3 Additional Embodiment 3

When a UE is able to perform transmission (or buffering operation) on the maximum N number of HARQ processes, a base station indicates the UE to respectively buffer data for initial transmission and data for retransmission preparation indicated at the same time for the L number of specific HARQ processes, reduces the total number of HARQ processes to the M number of HARQ processes, and sets the M number of HARQ processes to the UE.

In this case, when the UE sets a soft buffer size per HARQ process to the M number of HARQ processes, the UE can determine a soft buffer size of the L number of HARQ processes by putting a double weight on the soft buffer size of the L number of HARQ processes.

If the UE is able to perform UL transmission on the maximum N number of HARQ processes, the UE can equally divide a soft buffer for the N number of HARQ processes. The soft buffer buffers data previously transmitted for a specific HARQ process and can support an operation of combining the data with a retransmitted data.

In this case, as mentioned earlier in the additional embodiment 1 and the additional embodiment 2, if the base station indicates both initial transmission and retransmission preparation for the same HARQ process, the UE should store both data for the initial transmission and data for the retransmission preparation in the soft buffer. Hence, if the base station configures the UE to perform an operation of indicating the initial transmission and an operation of indicating the retransmission preparation at the same time for the L number of HARQ processes among the total N number of HARQ processes, the UE should configure a soft buffer size for the L number of HARQ processes to be greater than a soft buffer size for HARQ process performing either the initial transmission or the retransmission as much as twice at least.

In this case, since the soft buffer of the UE may be insufficient, the base station reduces the total number of HARQ processes to the M number of HARQ processes and puts a double weight on the L number of HARQ processes capable of indicating the initial transmission and the retransmission preparation at the same time among the M number of HARQ processes to divide the soft buffer size.

When the soft buffer is divided according to the HARQ process, the base station can inform the UE of a specific HARQ process number on which a weight is put and information on the weight via higher layer signaling. Or, if the base station informs the UE of the total number (M) of HARQ processes, the UE compares the total number (M) of HARQ processes with the maximum number (N) of HARQ processes set to the UE and may be then able to increase a soft buffer size as much as twice for the (N−M) number of HARQ processes in an ascending order or a descending order of HARQ process index. Or, if the base station informs the UE of the number of HARQ processes for increasing the soft buffer size, the UE may double the soft buffer size for HARQ processes corresponding to the number of HARQ processes in an ascending order or a descending order of the HARQ process index.

Or, if the base station sets fast UL processing for the L number of HARQ processes among the total N number of HARQ processes to the UE, it may be able to reduce the total number of HARQ processes to secure fast UL processing time for the L number of HARQ processes. For example, the base station reduces the total number of HARQ processes to the (N−L) number of HARQ processes and can inform the UE of information on the (N−L) number of HARQ processes.

In this case, when the total number of HARQ processes is reduced (e.g., M), the UE can ignore scheduling on specific HARQ process indexes (e.g., M, M+1, . . . , N) corresponding to the excluded HARQ processes.

3.3.3 Additional Embodiment 4

A base station can transmit a UL grant for initial transmission (first UL grant) and a UL grant for retransmission preparation (second UL grant), or a normal UL grant (first UL grant) and a UL grant for indicating initial transmission and retransmission at the same time (second UL grant) using methods described in the following to separately transmit the UL grants.

(1) It may apply a different RNTI (radio network temporary identifier) to the UL grants. In particular, it may apply a different RNTI to a hash function for determining a search space of DCI and a CRC mask. Or, it may apply a different RNTI to a CRC mask. In this case, the search space of the DCI is the same.

(2) It may apply a different DCI format (or DCI size) to the UL grants.

(3) It may transmit the UL grants to a different search space. In this case, a search space for the second grant can be positioned in a manner of being contiguous to a search space for the first UL grant.

In this case, the UL grants of the two types can be transmitted in the same subframe and the UE may expect that the UL grants of the two types are detected in the same subframe.

In this case, whether or not the retransmission data prepared by the UE is actually transmitted can be indicated by separate triggering DCI.

As mentioned earlier in the additional embodiment 2, when the base station transmits the UL grant for initial transmission and the UL grant for retransmission preparation, respectively, the UL grants for two purposes can be distinguished from each other by an indicator of DCI in the same DCI format or can be distinguished from each other by differentiating RNTI used as a CRC mask. Or, the UL grants may have a different DCI format. For example, the UL grant for retransmission preparation may have a smaller DCI size.

3.4 Embodiment 4

When a base station indicates a UE to perform pre-scheduling on partial subframes (set $S_0$) among the L (L≥1) number of contiguous subframes via a single UL grant and transmits dynamic scheduling to indicate the UE to transmit pre-scheduled data, the base station inform the UE of a part of scheduling information for transmitting UL data using pre-scheduling information and transmits another part of the scheduling information by including the information in dynamic signaling.

In LTE system, UL timing is configured by 4 TTIs (or 4 ms). This is because, as elements for performing processing delay performed by the UE, control channel monitoring latency, control channel decoding latency, UL encoding latency, power setup latency, TA, and the like are considered.

Yet, according to the pre-scheduling proposed by the embodiment 3 of the present invention, if the UE is configured to perform the aforementioned processing procedure, it is not necessary to configure the UL timing by 4 TTIs (or 4 ms). For example, the UE may be able to perform TB generation and encoding in advance based on pre-scheduling information to reduce UE encoding latency.

In this case, if the base station transmits a separate dynamic signal to trigger transmission of pre-scheduled data, it may be able to perform an operation of supporting more flexible scheduling by including scheduling information of a relatively small processing delay of the UE in the triggering signal. For example, the base station informs the UE of such pre-scheduling information as a TB size, an NDI (new data indicator), an RV (redundancy version), and the like and can transmit the triggering signal by including such information as RA (resource allocation), HARQ process index, and the like in the triggering signal.

3.4.1 Additional Embodiment 1

When a base station indicates a UE to perform pre-scheduling on PUSCH transmission in the N (N≥1) number of subframes via a UL grant and indicates the UE to transmit PUSCHs pre-scheduled via the UL grant through triggering DCI, if the UE fails to receive the triggering DCI within prescribed time (predetermined or configured by the base station) (or within a time period) from the timing at which the UL grant is received, the UE can cancel the indication of the UL grant.

In this case, the UL grant may have a form of dynamic signaling (e.g., DCI).

For example, the base station indicates the UE to perform pre-scheduling on PUSCH transmission to be transmitted in the M number of subframes by transmitting a UL grant using DCI and the PUSCH can be sequentially transmitted in the M number of subframes from the transmission starting timing indicated by triggering DCI. In this case, if the triggering DCI is transmitted after too much time is elapsed from the timing at which the UL grant is received, scheduling information included in the UL grant is not matched with channel information at the timing indicated by the triggering DCI due to channel aging, the scheduling information included in the UL grant is not helpful.

Preferably, it may transmit the PUSCHs pre-scheduled by the UL grant only when a time period during which the UL grant is valid is set and the triggering DCI is received during the time period. In this case, the time period may correspond to a predetermined value or a value configured by the base station via higher layer signaling such as RRC and the like.

3.4.2 Additional Embodiment 2

As a variation example of the additional embodiment 1, if the UE receives a normal UL grant (indicating both PUSCH generation and scheduling information on transmission timing) before a UL grant and triggering DCI are received, the UE determines that the UL grant is cancelled and may be able to perform PUSCH transmission according to the normal UL grant.

3.4.3 Additional Embodiment 3

When a base station indicates a UE to perform pre-scheduling on PUSCH transmission in the N (N≥1) number of subframes via higher layer signaling such as RRC and indicates the UE to transmit the pre-scheduled PUSCHs via triggering DCI, the base station can inform the UE of HARQ process ID information using the triggering DCI.

For example, similar to an SPS operation, if the base station indicates the UE to perform pre-scheduling on PUSCH transmission in the M number of subframes via RRC signaling, the PUSCHs can be sequentially transmitted in the M number of subframes from the transmission starting timing indicated by the triggering DCI.

In this case, since it is necessary to provide information on a HARQ process ID according to the introduction of asynchronous HARQ in UL of LAA system and available HARQ processes are changing over time, the information on the HARQ process ID can be delivered via RRC signaling. Hence, when pre-scheduling is indicated via RRC, the present invention proposes a method for triggering DCI to indicate HARQ process ID information on the M number of pre-scheduled PUSCHs.

3.4.4 Additional Embodiment 4

When a base station indicates a UE to perform pre-scheduling on PUSCH transmission in the N (N≥1) number of subframes via a UL grant and indicates the UE to transmit PUSCHs pre-scheduled via the UL grant through triggering DCI, the base station can indicate a time period described in the following from the timing at which the triggering DCI is received via the triggering DCI. Or, the timing at which the triggering DCI is received may implicitly indicate the time period described in the following.

Time period ranging from timing preceding as much as T1 from the timing at which the triggering DCI is received to timing prior to T2 (where, T1>T2≥0)

In this case, the UE can transmit the PUSCHs pre-scheduled by UL grant(s) satisfying the conditions described in the following within the indicated time period according to the transmission timing indicated by the triggering DCI.

(1) All UL grant(s) (within the time period indicated by the triggering DCI)

(2) All UL grant(s) in the latest subframe in which a UL grant exists (within the time period indicated by the triggering DCI)

(3) Latest UL grant per UE (within the time period indicated by the triggering DCI)

In this case, the UL grant may have a form of dynamic signaling (e.g., DCI).

When the base station indicates the UE to perform pre-scheduling on PUSCHs via the UL grant and indicates the UE to actually transmit the pre-scheduled PUSCHs via triggering DCI, the UE may incorrectly interpret a UL grant indicated by specific triggering DCI.

For example, if a UE fails to receive a UL grant (P1) and receives triggering DCI (D1) corresponding to the P1 only, the UE is unable to identify a UL grant indicated by the received triggering DCI (D1). If there is a UL grant (P2) (irrespective of the triggering DCI (D1)) transmitted by a base station, the UE may misunderstand that transmission of the P2 is indicated by the D1. Hence, the present invention proposes a method of indicating a time period at which a UL grant indicated by triggering DCI is positioned using the triggering DCI. If a UE fails to receive the UL grant in the time period indicated by the triggering DCI, the UE determines that the triggering DCI is cancelled and may not follow a transmission indication.

Additionally, a base station can precisely indicate timing (or a subframe) at which a corresponding UL grant(s) exists via the triggering DCI. In particular, if a UL grant(s) is transmitted at timing preceding as much as N number of subframes from the timing at which the triggering DCI is received, the triggering DCI can indicate the N value (or a subframe position at which the UL grant is transmitted). If the UE fails to receive a UL grant at the timing indicated by the triggering DCI, the UE determines that the triggering DCI is cancelled and may not follow a transmission indication.

3.4.5 Additional Embodiment 5

When a base station indicates a UE to perform pre-scheduling on PUSCH transmission in the N (N≥1) number of subframes via a UL grant and indicates the UE to transmit PUSCHs pre-scheduled via the UL grant through triggering DCI, the base station assigns a unique ID of the UL grant using (all or a part of) scheduling information of the UL grant and a function of a transmitted subframe index and can indicate an ID of a UL grant to be transmitted via the triggering DCI.

In this case, the UL grant may have a form of dynamic signaling (e.g., DCI).

When a base station indicates a UE to perform pre-scheduling on a specific PUSCH transmission via a UL grant and indicates the UE to actually transmit the pre-scheduled PUSCH via triggering DCI, it is necessary to precisely indicate a UL grant to which the pre-scheduling is transmitted via the triggering DCI to get rid of mismatch between the base station and the UE. As a method for solving the abovementioned problem, in order to determine a UL grant to be indicated by the triggering DCI, the base station assigns a unique ID of the UL grant using (all or a part of) scheduling information of the UL grant and a function of a transmitted subframe index and can indicate an ID of the UL grant to be transmitted via the triggering DCI.

3.4.6 Additional Embodiment 6

When a base station indicates a UE to perform pre-scheduling on PUSCH transmission in the N (N≥1) number of subframes via a UL grant and indicates the UE to transmit PUSCHs pre-scheduled via the UL grant through triggering DCI, the UE can report UE capability on the number of subframes in which the PUSCH is transmitted (or the number of TBs) capable of performing the pre-scheduling to the base station.

In this case, the UL grant may have a form of dynamic signaling (e.g., DCI).

If the base station indicates the UE to perform pre-scheduling on the N number of subframes, the UE should generate TBs corresponding to the N number of subframes in advance. In this case, the maximum number of TBs capable of being generated by the UE in advance for the pre-scheduling can be restricted according to the UE capability in consideration of a buffer capacity capable of storing the TBs generated by the UE in advance.

Hence, the present invention defines the number of PUSCH transmission subframes (or the number of TBs) on which pre-scheduling is performed as UE capability. The present invention proposes a method of reporting UE capability information on pre-scheduling to the base station. The base station can indicate pre-scheduling appropriated for each UE based on the reported UE capability. If a specific UE receives pre-scheduling indication not supported by UE capability of the specific UE (e.g., pre-scheduling indication exceeding the maximum number of PUSCH transmission subframes (or TB number) capable of being generated by the specific UE in advance), the specific UE may not follow the pre-scheduling indication.

3.4.7 Additional Embodiment 7

When a base station indicates a UE to perform pre-scheduling on PUSCH transmission in the N (N≥1) number of subframes via a UL grant and indicates the UE to transmit PUSCHs pre-scheduled via the UL grant through triggering DCI, if the UE receives a UL grant again (before the corresponding triggering DCI is received) after receiving the UL grant, the UE may perform one of operations described in the following.

(1) Follows indication of the latest UL grant only
(2) Follows indications of all received UL grants In this case, the UL grant may have a form of dynamic signaling (e.g., DCI).

When a UE receives a UL grant, if the UE receives a different UL grant before corresponding triggering DCI is received, the present invention defines an operation of the UE. Specifically, it is necessary for the UE to determine whether or not the previously received UL grant is ignored and whether or not transmission preparation is performed on all received UL grants.

Since there is a restriction on pre-scheduling capability of a UE, preferably, it may expect that the UE operates according to a pre-scheduling indication indicated by a latest UL grant. In particular, if the UE receives a plurality of UL grants before triggering DCI is received, the UE may prepare PUSCH transmission using pre-scheduling information corresponding to the latest UL grant.

When the base station indicates the UE to perform pre-scheduling on PUSCH transmission in the N (N≥1) number of subframes via a UL grant (or RRC signaling) and indicates the UE to transmit PUSCHs pre-scheduled via the UL grant through triggering DCI, the indication of the base station can be applied only when UL transmission is indicated by self-carrier scheduling in an LAA Scell. In other word, the indication of the base station can be applied only when a UL grant is transmitted in the LAA Scell in which the PUSCH transmission is to be performed. Or, the base station may set whether to apply the UL grant and the triggering DCI-based PUSCH transmission operation to the UE via higher layer signaling.

3.4.8 Additional Embodiment 8

When a base station indicates a UE to perform pre-scheduling on PUSCH transmission in the N (N≥1) number of subframes via a UL grant and indicates the UE to transmit PUSCHs pre-scheduled via the UL grant through triggering DCI, it may be able to configure a time gap as follows.

(1) Configure a predetermined time gap length
(2) Configure a time gap length according to UE capability The UE may assume that (pre-scheduled) PUSCHs indicated by specific triggering DCI correspond to PUSCHs pre-scheduled by a UL grant(s), which is transmitted prior to the timing at which the triggering DCI is received as much as the time gap.

When the UE is indicated to transmit PUSCH pre-scheduled by triggering DCI after pre-scheduling is performed via a UL grant, if time between the triggering DCI and PUSCH transmission is not sufficient, the UE may fail to complete preparation of the PUSCH transmission. For example, although it is able to perform encoding on data to be transmitted via a UL grant, PUSCH transmit power can be determined only after an actual transmission position is indicated via triggering DCI. In this case, in order for the UE to calculate the PUSCH transmit power, minimum time is required. In particular, in order to calculate the PUSCH transmit power, it is necessary to have a time gap between the triggering DCI and PUSCH (indicated to be transmitted via the triggering DCI). In this case, the time gap may correspond to a fixed value or a value determined according to UE capability for processing time of the UE.

When the time gap is defined, if specific triggering DCI indicates PUSCH to be transmitted, the UE can assume that the PUSCH transmission is performed on a target of PUSCHs pre-scheduled by a UL grant which is received prior to the timing at which the triggering DCI is received as much as the time gap.

Figure 18:
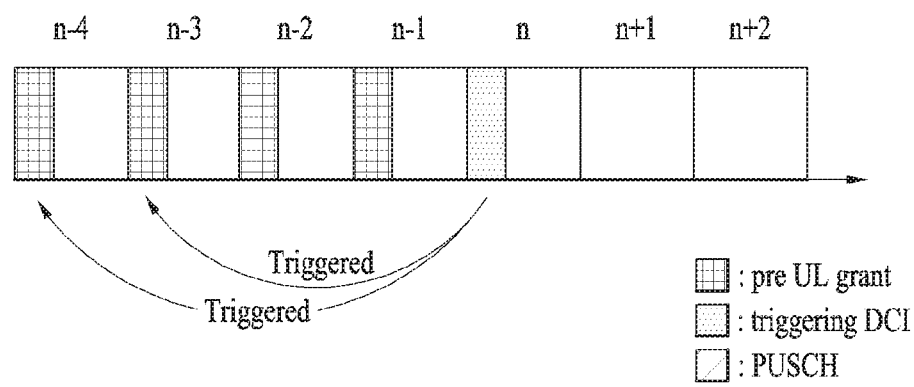
FIG. 18 is a diagram illustrating an operation of indicating PUSCH transmission indicated by a triggering DCI received in an $n^{th}$ subframe when a time gap is configured.

When a time gap is configured by 2 subframes (or 2 ms), if a UE receives triggering DCI in an $n^{th}$ subframe, FIG. 18 is a diagram illustrating a case of transmitting PUSCHs corresponding to a UL grant(s), which is received in a subframe prior to an $(n-2)^{th}$ subframe, only.

3.4.9 Additional Embodiment 9

If a base station indicates a UE to perform pre-scheduling on PUSCH transmission in the N (N≥1) number of subframes via a UL grant and the UE receives triggering DCI within a time period during which the UL grant (configured by the base station) is valid, the UE performs transmission of PUSCHs pre-scheduled by the UL grant. In this case, the UE may assume a single UE grant only within the time period during which the UL grant is valid.

In this case, a (predetermined) time gap can be excluded from the time period during which the UL grant is valid on the basis of the timing at which the UL grant is received.

For example, assume that the UE receives a UL grant (UG1) and then the UE receives a new UL grant (UG2) within a time period during which the UG1 is valid. In this case, as mentioned earlier in the additional embodiment 7, the UE may assume that all UL grants are valid. Yet, if the UL grants (UG1 and UG2) different from each other indicate a different PUSCH scheduling on the same subframe in the abovementioned example, it may be unclear for the UE to determine an indication for which the UE follows.

In order to prevent the abovementioned situation, if a UE receives a specific UL grant, the UE may assume that a new UL grant is not received during valid time of the UL grant. In particular, although a new UL grant is received during the valid time, the UE considers the new UL grant as invalid and can ignore the new UL grant.

3.4.10 Additional Embodiment 10

If a base station indicates a UE to perform pre-scheduling on PUSCH transmission in the N (N≥1) number of subframes via a UL grant and the UE receives triggering DCI within a time period during which the UL grant (configured by the base station) is valid, the UE performs transmission of PUSCHs pre-scheduled by the UL grant. In this case, if a DMTS (DRS measurement timing configuration) period (or a measurement gap) is included in the time period during which the UL grant indicated by the base station is valid, the UE can consider it as follows.

(1) The UE does not expect that triggering DCI is received in the DMTC period (or the measurement gap) included in the time period during which the UL grant is valid.

(2) The UE does not expect that triggering DCI is received in the DMTC period (or the measurement gap) included in the time period during which the UL grant is valid and the UE extends a length of the valid time period as much as the DMTC period (or the measurement gap).

For example, if a DMTS period (or a measurement gap) is included in a time period during which a UL grant is valid, it may be necessary for a UE to measure a different frequency band rather than a frequency band of the UE (inter-frequency measurement) during the DMTC period. In this case, the UE may fail to perform triggering DCI detection during the DMTC period (or the measurement gap) although the DMTS period is included in the time period during which the UL grant is valid. Hence, the UE may not expect that triggering DCI is received during the DMTC period. In this case, in order to compensate for time during which the UE fails to receive the triggering DCI, it may permit an operation of extending the time period during which the UL grant is valid as much as the time.

3.4.11 Additional Embodiment 11

If a base station indicates a UE to perform pre-scheduling on PUSCH transmission in the N (N≥1) number of subframes via a UL grant and the UE receives triggering DCI within a time period during which the UL grant (configured by the base station) is valid, the UE performs transmission of PUSCHs pre-scheduled by the UL grant. In this case, if OFF time according to a DRX (discontinuous reception) operation is included in the time period during which the UL grant indicated by the base station is valid, the UE may operate as follows.

(1) The UE does not expect triggering DCI during the OFF time included in the time period during which the UL grant is valid.

(2) The UE assumes that the OFF time included in the time period during which the UL grant is valid is not applied (i.e., the UE always recognizes the time period during which the UL grant is valid as ON time within a DRX period)

In this case, in the additional embodiment 11, ON time within a DRX period includes not only an ON period but also DRX inactivity time. The remaining time except the ON time within the DRX period is referred to as OFF time.

In case of the operation (1) proposed in the additional embodiment 11, it may assume that the time period during which the UL grant indicated by the base station is valid corresponds to a valid time length of the ON time.

In LTE system according to the embodiment of the present invention, a DRX operation is supported to reduce battery consumption of a UE. An ON period capable of detecting PDCCH is set to the UE within a repeated prescribed time unit which is referred to as a DRX period. In this case, if PDCCH is detected within the ON period, PDCCH detection can be performed by maintaining an ON state during DRX inactivity time configured by the base station.

In this case, if OFF time according to a DRX operation is included in the time period during which the UL grant indicated by the base station is valid, it is necessary to define a UE operation. Simply, if the UE puts a priority on the DRX operation, the UE may not expect triggering DCI during the OFF time although the OFF time is included in the time period during which the UL grant is valid. The UE can perform OFF operation on PDCCH detection.

In order to increase transmission occasion in an unlicensed band, the UE may put a higher priority on the time period during which the UL grant is valid to assume that the OFF time included in the time period during which the UL grant is valid is not applied. In other word, the UE can always recognize the time period during which the UL grant is valid as ON time.

3.4.12 Additional Embodiment 12

If a base station indicates a UE to perform pre-scheduling on PUSCH transmission in the N (N≥1) number of subframes via a first UL grant and the UE receives a second UL grant (e.g., triggering DCI) within a time period during which the first UL grant (configured by the base station) is valid, the UE performs transmission of PUSCHs pre-scheduled by the first UL grant. In this case, the UE may not expect reception of a new first UL grant during a time period described in the following.

(1) When the UE expects that a second UL grant is received after an $(n+k-1)^{th}$ subframe in response to a first UL grant received in an $n^{th}$ subframe, a time period ranging from the subframe ($n^{th}$ subframe) in which the first UL grant is received to an (n+valid time period-k)$^{th}$ subframe.

In this case, if the first UL grant is received in the $n^{th}$ subframe and the valid time period corresponds to L, the UE may expect the reception of the second UL grant until an $(n+L)^{th}$ subframe.

In this case, the k may correspond to a value corresponding to minimum UL timing for performing UE processing until the second UL grant is transmitted after the first UL grant is received.

Specifically, if the UE expects that a second UL grant is to be received after the $(n+k-1)^{th}$ subframe in response to the first UL grant received in the $n^{th}$ subframe, the UE can expect that the second UL grant is to be received during a period ranging from an $(n+k)^{th}$ subframe to a subframe at which a valid time period ends. For example, if the valid time period corresponds to the L number of subframes, a valid time period for the first UL grant received by the UE corresponds to a period ranging from an $(n+1)^{th}$ subframe to an $(n+L)^{th}$ subframe. In this case, when k corresponds to 2, if the UE receives a new first UL grant after an $(n+L-2)^{th}$ subframe, the UE may expect that a second UL grant is to be received after an $(n+L)^{th}$ subframe in response to the new first UL grant. In particular, a period during which the second UL grant is to be received in response to the new first UL grant is not overlapped with a period ranging from an $(n+2)^{th}$ subframe to an $(n+L)^{th}$ subframe during which the second UL grant is to be received in response to the first UL grant previously received by the UE.

Hence, the UE may not expect that the new first UL grant is received during a period ranging from the subframe in which the first UL grant is received to the $(n+L-2)^{th}$ subframe. If the new first UL grant is received during the period, the UE can ignore the UL grant.

3.4.13 Additional Embodiment 13

If a base station indicates a UE to perform pre-scheduling on PUSCH transmission in the N (N≥1) number of subframes via a first UL grant and the UE receives a second UL grant (e.g., triggering DCI) in an $n^{th}$ subframe, the UE performs transmission of pre-scheduled PUSCH in an $(n+L)^{th}$ subframe. In this case, if the UE expects that a second UL grant is to be received after an $(m+k)^{th}$ subframe in response to a first UL grant received in an $m^{th}$ subframe, the UE can determine that PUSCH transmission is valid only when L+k is equal to greater than a prescribed length (e.g., 4 ms).

For example, if a UE receives pre-scheduling and receives a second UL grant (e.g., triggering DCI) in an $n^{th}$ subframe in response to the pre-scheduling, it may assume that the UE is able to perform PUSCH transmission according to the second UL grant in an $(n+L)^{th}$ subframe. In this case, the UE may expect that a second UL grant is to be received after an $(m+k)^{th}$ subframe in response to a first UL grant received in an $m^{th}$ subframe. Hence, PUSCH transmission corresponding to the first UL grant, which is received in the $m^{th}$ subframe, can be performed after an $(m+k+L)^{th}$ subframe. In this case, k+L may correspond to UL timing and the value can be configured to be equal to or greater than UL timing according to a normal UL grant. Hence, the UE determines that PUSCH transmission corresponding to the first UL grant is valid only when the k+L is equal to or greater than a prescribed length. Otherwise, the UE determines that the PUSCH transmission corresponding to the first UL grant is not valid and can omit the PUSCH transmission.

3.5 Embodiment 5

If a base station indicates a UE to perform pre-scheduling on partial subframes (set $S_0$) among the L (L≥1) number of contiguous subframes via a single UL grant, the UE generates a TB according to pre-scheduling using one of methods described in the following.

(1) Generate a TB based on MCS for a set $S_0$ in the UL grant and RA (or number of RBs to be allocated) or a TB size (2) Generate a TB based on MCS configured via higher layer signaling such as RRC and RA (or number of RBs to be allocated) or a TB size (3) Generate a TB based on MCS for a set $S_0$ in the UL grant and RA (or number of RBs to be allocated) configured via RRC (4) Generate a TB based on RA (or number of RBs to be allocated) for a set $S_0$ in the UL grant and MCS configured via RRC In this case, the MCS for the set $S_0$ in the UL grant or the RA information may follow scheduling information on subframes (MCS or RA information commonly applied to the L number of subframes) rather than pre-scheduling.

As mentioned earlier in the embodiment 4, when a base station informs a UE of information by including pre-scheduling information for generating a TB in a UL grant, if the MCS and the RA information are always included in the UL grant, it may increase control signaling overhead of the UL grant.

In this case, as a method of reducing the control signaling overhead, it may utilize an SPS (semi-persistent scheduling) scheme of LTE system. Simply, the MCS and the RA or the TB size is configured via higher layer signaling such as RRC and whether or not pre-scheduling is performed on the set $S_0$ can be indicated by 1-bit information in the UL grant.

As an additional embodiment, when a base station configures the MCS or the RA using an SPS operation and indicates a UE to transmit PUSCH in the L (L≥1) number of subframes via a single UL grant, the UE can perform PUSCH transmission on subframes selected from among the L number of subframes using one of the methods described in the following according to the MCS or the RS configured using the SPS operation.

Figure 19:
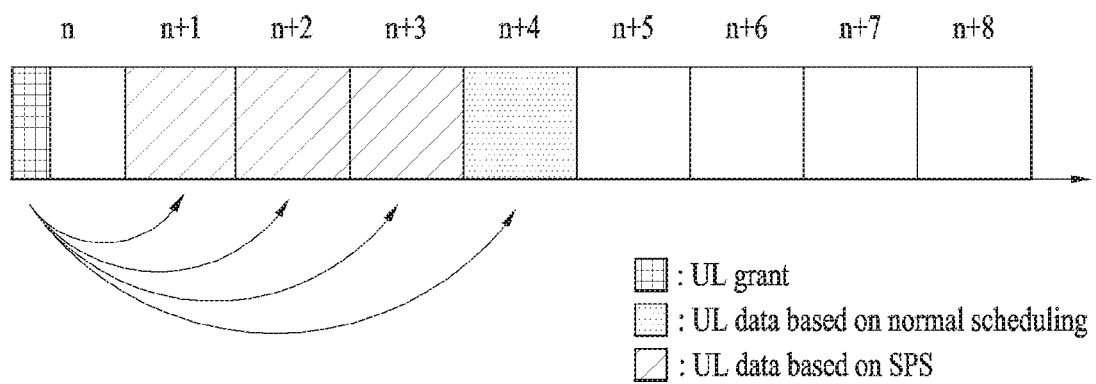
FIG. 19 is a diagram illustrating a configuration according to an MCS (modulation and coding scheme) configured in SPS (semi-persistent scheduling), RA (resource allocation) information, an MCS configured in a UL grant, or RA information when PUSCH is transmitted according to multi-subframe scheduling.

1) M number of subframes configured via higher layer signaling among the L number of subframes 2) Subframes having fast UL timing faster than reference UL timing among the L number of subframes FIG. 19 is a diagram illustrating a configuration according to an MCS (modulation and coding scheme) configured in SPS (semi-persistent scheduling), RA (resource allocation) information, an MCS configured in a UL grant, or RA information when PUSCH is transmitted according to multi-subframe scheduling. As shown in FIG. 19, when a base station performs multi-subframe scheduling on 4 subframes, if a UE receives a UL grant in an $n^{th}$ subframe, PUSCH transmission is performed in subframes prior to an $(n+4)^{th}$ subframe according to MCS or RA information configured in SPS and PUSCH transmission is performed in the $(n+4)^{th}$ subframe and subframes after the $(n+4)^{th}$ subframe according to the MCS or RA information configured in the UL grant.

More generally, the base station can perform PUSCH transmission in subframes having fast UL timing faster than reference UL timing among the L number of subframes by utilizing MCS information or RA information configured via higher layer signaling and other scheduling information (e.g., CIF (carrier indication field), diff0-1A, resource allocation (UL hopping), TBS (transmission block size), UL index, UL DAI, CSI report, SRS request, RA type, TPMI/layer (DCI4), padding, HARQ process ID, cross/multi-subframe information, MCS index, modulation order, coding rate, number of coded symbols (or resource allocation), HARQ process index, NDI (new data indicator), RV (redundancy version), TPC (transmission power control), DM-RS CS (cyclic shift), OCC (orthogonal cover code), FH (frequency hopping), and aperiodic CSI request).

3.6 Embodiment 6

When a base station indicates a UE to transmit PUSCH in the L (L≥1) number of contiguous subframes via a single UL grant, one of the following can be utilized as an ID of the UL grant.

(1) A counter configuration circularly increasing in the UL grant (2) Timing (or subframe index) at which the UL grant is transmitted In this case, if the base station indicates a specific UL grant ID using a UL grant or separate dynamic signaling, the UE can transmit or retransmit a UL data (pre)scheduled by a UL grant corresponding to the UL grant ID according to fast UL timing configured in advance.

As a method of utilizing the aforementioned embodiment 3, the base station can configure a single UL grant to include a bit field indicating transmission of data pre-scheduled by a UL grant transmitted at previous timing, scheduling information on data to be actually transmitted, and pre-scheduling information on data to be transmitted in the future. For example, a single UL grant received in an $n^{th}$ subframe can include information on whether or not data pre-scheduled in the past is transmitted in an $(n+1)^{th}$ subframe, an $(n+2)^{th}$ subframe, and an $(n+3)^{th}$ subframe, pre-scheduling to be transmitted in the future, and scheduling on data to be actually transmitted in an $(n+4)^{th}$ subframe and subframes after the $(n+4)^{th}$ subframe.

Figure 20:
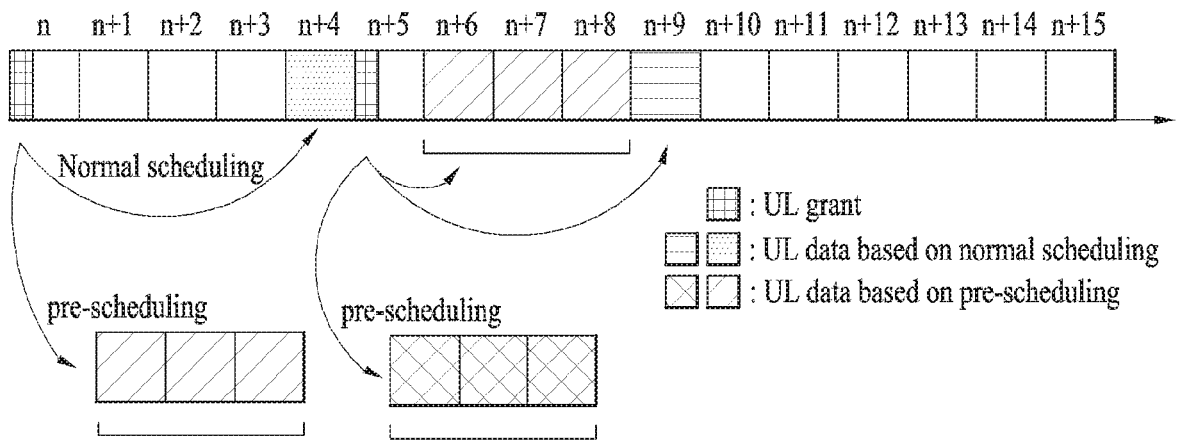
FIG. 20 is a diagram illustrating a scheduling operation indicating whether or not a previously scheduled data is transmitted, pre-scheduling to be transmitted in the future, and data to be actually transmitted via a UL grant.

FIG. 20 is a diagram illustrating a scheduling operation indicating whether or not a previously pre-scheduled data is transmitted, pre-scheduling to be transmitted in the future, and data to be actually transmitted via a UL grant according to the abovementioned example.

Referring to FIG. 20, among the M number of subframes corresponding to targets of pre-scheduling, a specific subframe may correspond to a specific subframe among the L number of subframes. Transmission timing compared to a triggering timing on the M number of subframes may follow transmission timing compared to a UL grant of a subframe among transmission timing compared to UL grant on the L number of subframes in the UL grant. For example, referring to FIG. 20, each of transmission timing of 3 pre-scheduled subframes corresponds to +1, +2, and +3 TTI compared to UL grant. Hence, the UE can perform transmission using such transmission timing as +1, +2, and +3 compared to triggering timing at which pre-scheduling data is transmitted in the future.

Yet, when the base station indicates the UE to transmit pre-scheduled data, a mismatch may occur between the base station and the UE regarding pre-scheduling indicated by a certain UL grant in the past. For example, assume that the base station sequentially transmits a first UL grant and a second UL grant and the UE fails to receive the second UL grant. If the base station forwards an On/Off indication of 1-bit long to the UE to indicate the UE to transmit a pre-scheduled data, the base station expects transmission of data pre-scheduled by the most recently transmitted second UL grant. However, the UE transmits data pre-scheduled by the first UL grant received by the UE to the base station. As a result, a mismatch may occur between the base station and the UE.

Hence, similar to a DAI concept of LTE system, the present invention proposes a method of including a circularly increasing counter in a UL grant and indicating a UL grant corresponding to a pre-scheduled data using a value of the counter. Or, besides counter value, it may indicate a UL grant corresponding to a pre-scheduled data by indicating a time offset from a current UL grant. In this case, if the UE receives an indication indicating a UL grant, which is not received by the UE using the abovementioned method, the UE may omit the transmission of the pre-scheduled data.

3.7 Embodiment 7

A UE expects that a PHICH resource (e.g., a PHICH group and an orthogonal sequence combination) implies one of values described in the following.

(1) (Minimum) RB index of a PUSCH resource, DM-RS sequence information (2) (Minimum) CCE (control channel element) index information of a UL grant In this case, if the PHICH resource is received, the UE can perform or cancel (re)transmission based on fast UL timing on PUSCH (or UL grant) corresponding to the PHICH resource in a specific subframe compared to PHICH transmission timing according to a PHICH value.

When a UE receives a UL grant transmitted by a base station in an $n^{th}$ subframe and performs UL data transmission in an $(n+4)^{th}$ subframe, assume that the UE fails to perform the UL data transmission due to the failure of UL LBT operation. If the base station does not have DL data to be additionally transmitted, the base station may expect that the UE performs quick retransmission in response to the UL grant. In order to indicate the quick retransmission of the UE, the base station may utilize a PHICH resource including relatively lower control signaling overhead and detection complexity compared to DCI and PDCCH. For example, when a UE receives a UL grant transmitted by a base station in an $n^{th}$ subframe and performs UL data transmission in an $(n+4)^{th}$ subframe, the UE may operate as follows.

1) The UE detects a PHICH resource in an $(n+5)^{th}$ subframe. If a value indicated by the PHICH resource corresponds to '1', the UE performs transmission (according to fast UL timing) in response to PUSCH transmission corresponding to a PHICH resource in an $(n+4)^{th}$ subframe. If the value indicated by the PHICH resource corresponds to '0', the UE may recognize it as cancellation (e.g., cell-specific).

Additionally, the base station can provide information such as a HARQ process number, NDI, RV, etc. to the UE by utilizing a plurality of PHICH resources or changing a coding method of a PHICH resource.

3.8 Embodiment 8

A UE expects that a PHICH resource (e.g., a PHICH group and an orthogonal sequence combination) implies one of values described in the following.

(1) A specific subframe compared to PHICH transmission timing (2) A specific subframe compared to PHICH transmission timing, (minimum) RB index of a PUSCH resource, DM-RS sequence information (3) A specific subframe compared to PHICH transmission timing and (minimum) CCE index information of a UL grant If the UE receives the PHICH resource, the UE can perform or cancel fast UL timing-based (re)transmission on all (or specific) PUSCHs (or a UL grant) corresponding to transmission timing according to a PHICH value.

As a variation example of the embodiment 7, a PHICH resource may imply information on a PUSCH resource (or a UL grant) corresponding to a target of retransmission. Hence, it may consider operations described in the following.

1) If a PHICH group of a PHICH resource and a combination of orthogonal sequences indicate a time offset value and a UE receives the PHICH resource, all UL grants, which are transmitted between a current subframe and a subframe to which a time offset (corresponding to the PHICH resource) is applied, are recognized as PUSCH transmission according to fast UL timing or cancellation according to a value of the PHICH resource. (e.g., cell-specific)

2) If a PHICH group of a PHICH resource and a combination of orthogonal sequences indicate a time offset, a PUSCH RB index, a DM-RS sequence, etc., and a UE receives the PHICH resource, PUSCH, which is transmitted between a current subframe and a subframe to which a time offset (corresponding to the PHICH resource) is applied, is recognized as PUSCH transmission according to fast UL timing or cancellation according to a value of the PHICH resource. (e.g., cell-specific)

Additionally, the base station can provide information such as a HARQ process number, NDI, RV, etc. to the UE by utilizing a plurality of PHICH resources or changing a coding method of a PHICH resource.

3.9 Embodiment 9

When a UE transmits PUSCH according to fast UL timing having transmission timing faster than reference UL timing, if UL transmit power equal to or greater than a prescribed level is not guaranteed at the PUSCH transmission timing, the UE may operate using one of methods described in the following.

(1) The UE may omit the PUSCH transmission. In this case, it may also be able to omit an LBT operation corresponding to the omitted PUSCH.

(2) The UE may apply reference UL timing to the PUSCH transmission.

It may be necessary for the UE to have a procedure of controlling UL transmit power, i.e., minimum time for controlling UL transmission. Yet, if the UE transmits PUSCH based on fast UL timing of the UE, it may have a case that UL transmit power remained for transmitting the PUSCH is too small.

For example, assume that the base station schedules first PUSCH based on reference UL timing in an $n^{th}$ subframe and the UE allocates UL transmit power as much as UL transmit power required by the first PUSCH prior to an $(n+3)^{th}$ subframe. If the base station indicates the UE to transmit fast UL timing-based second PUSCH in the $(n+3)^{th}$ subframe, since the UE does not have time to control the UL transmit power for the first PUSCH within 1 ms, the UE is able to allocate remaining transmit power to the second PUCCH among the total UL transmit power. In this case, if the remaining transmit power is too small, since it is disadvantageous for the UE to compete with other nodes in a UL LBT procedure, the UE may abandon transmission of the second PUSCH. Or, the UE transmits the second PUSCH based on the reference UL timing and may allocate UL transmit power again.

3.10 Embodiment 10

When a UE transmits PUSCH based on fast UL timing having transmission timing faster than reference UL timing, the UE does not apply an aperiodic CSI request field to a UL grant indicating the PUSCH transmission.

In LTE system, in order to report CSI (channel state information), time at which CSI calculation is performed and reference target timing (i.e., a CSI reference resource) used for calculating CSI are configured on the basis of the timing at which a UL grant is received. In other word, in LTE system, a method of calculating CSI on the basis of reference timing is configured.

For example, if an aperiodic CSI request field of a UL grant, which is received in an $n^{th}$ subframe in a FDD system, indicates a CSI report, the UE calculates CSI corresponding to a subframe in which the aperiodic CSI request is indicated. This is because the UE expects that CSI report is to be performed in an $(n+4)^{th}$ subframe on the basis of the nth subframe in which the aperiodic CSI request is indicated.

Yet, if fast UL timing is applied, the UE should perform CSI calculation within time shorter than 4 ms previously provided for the CSI calculation. As a solution for the abovementioned problem, when PUSCH is transmitted according to fast UL timing, it may not apply the aperiodic CSI request field to the UL grant indicating the PUSCH transmission.

Additionally, the base station can configure UL timing to be applied to PUSCH according to pre-scheduling information or a value of an aperiodic CSI request field of a UL grant (for a pre-scheduling data) as follows.

(1) If an aperiodic CSI request field exists in pre-scheduling information and aperiodic CSI report is triggered, the UE may apply reference UL timing or legacy UL timing when PUSCH transmission is performed. On the contrary, if the aperiodic CSI request field exists in the pre-scheduling information but the aperiodic CSI report is not triggered, the UE may apply fast UL timing when PUSCH transmission is performed.

(2) If an aperiodic CSI request field exists in a control signal (or a UL grant) triggering transmission of pre-scheduled data and aperiodic CSI report is triggered, the UE may apply reference UL timing or legacy UL timing when PUSCH transmission is performed. On the contrary, if the aperiodic CSI request field exists in the control signal (or a UL grant) triggering transmission of pre-scheduled data but the aperiodic CSI report is not triggered, the UE may apply fast UL timing when PUSCH transmission is performed.

3.11 Embodiment 11

When a base station indicates a UE to perform multi-subframe scheduling (or whether or not PUSCH is transmitted) on L number of UL subframes, the base station can change a time difference (UL grant-to-PUSCH timing) between timing at which a UL grant is received and timing at which PUSCH is transmitted according to a value of the L. Or, the maximum number of multi-subframes capable of being scheduled by the base station can be determined according to the time difference between the timing at which a UL grant is received and the timing at which PUSCH is transmitted.

In this case, in case of performing the multi-subframe scheduling, the timing at which the PUSCH is transmitted can be defined on the basis of a subframe of a specific position among multi-subframes. For example, a first subframe among the multi-subframes can be defined as a reference subframe.

Figure 21:
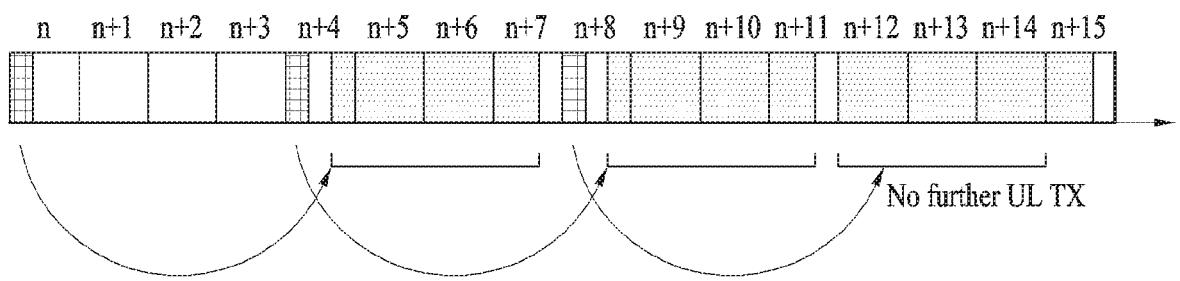
FIGS. 21 to 23 are diagrams illustrating an operation according to multi-subframe scheduling proposed in the present invention.

When LAA system follows reference UL timing or legacy UL timing of LTE system, if a base station performs multi-subframe scheduling on 4 UL subframes, as shown in FIG. 21, use of a DL subframe can be minimized during time between contiguous UL subframes.

In this case, the base station may expect that the UE receives DL transmission in a subframe right after a subframe in which PUSCH transmission according to the multi-subframe scheduling is completed. Or, the base station may indicate whether or not DL reception is performed in a specific subframe through a bit field of a UL grant indicating the multi-subframe scheduling. For example, when the multi-subframe scheduling is performed on L number of UL subframes, it may be able to receive a DL signal in a subframe right after an $i^{th}$ subframe.

Figure 22:
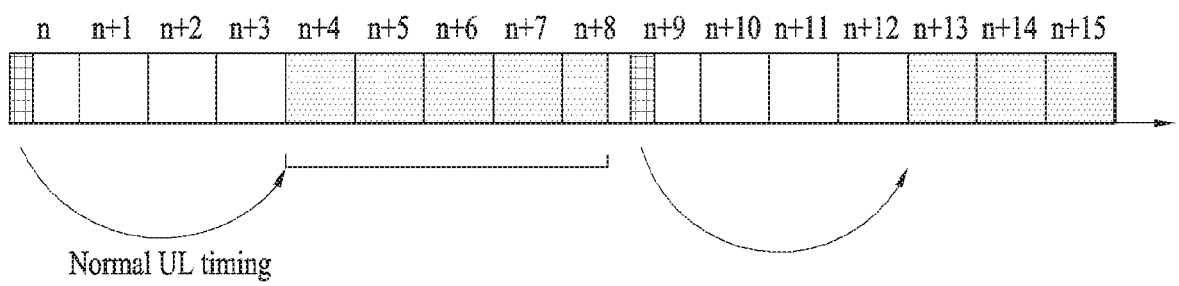
Figure 23:
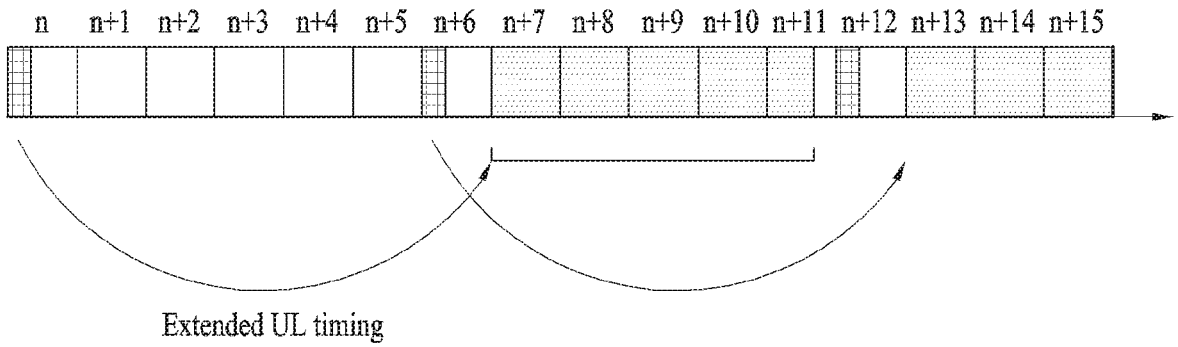

If a time difference (UL grant-to-PUSCH timing) between timing at which a UL grant is received and timing at which PUSCH is transmitted corresponds to 4 ms and multi-subframe scheduling of a base station is performed on 5 UL subframes, as shown in FIG. 21, it is difficult to gather UL subframes and PUSCH can be transmitted as shown in FIG. 22.

In this case, if the time difference (UL grant-to-PUSCH timing) between the timing at which a UL grant is received and the timing at which PUSCH is transmitted is increased in proportion to the number of multi-subframe scheduling, as shown in FIG. 22, it may be able to transmit UL subframes in a manner of gathering the UL subframes using a structure more profitable to an LBT operation.

Hence, the present invention proposes a method of changing the time difference (UL grant-to-PUSCH timing) between the timing at which a UL grant is received and the timing at which PUSCH is transmitted in proportion to the number of target UL subframes to be actually transmitted via the multi-subframe scheduling. Or, the base station can configure the UE to follow transmission timing to which a time offset is applied and informs the UE of information on the time offset via RRC or a bit field of a UL grant. In this case, the time offset can be configured by additionally applying the first subframe on which the multi-subframe scheduling is performed to the reference UL timing.

The methods proposed in the present invention can be selectively applied according to whether a scheduling scheme corresponds to cross-carrier scheduling or self-carrier scheduling.

3.12 Embodiment 12

When a base station performs multi-subframe scheduling on N (N≥1) number of subframes, if the base station designates the same HARQ process number to the N number of subframes in DCI for performing the multi-subframe scheduling, a UE attempts to transmit a single subframe for the HARQ process in a time window (consisting of the N number of subframes) which is defined on the basis of the timing at which the DCI is received.

When the base station performs the multi-subframe scheduling in LAA system according to the embodiment of the present invention, although it is able to transmit a new data according to a subframe, it may provide more transmission occasions to the same data. It may be able to more efficiently perform signaling using a method of reusing the DCI indicating the multi-subframe scheduling rather than a method of newly defining a separate DCI for the abovementioned operation.

Figure 24:
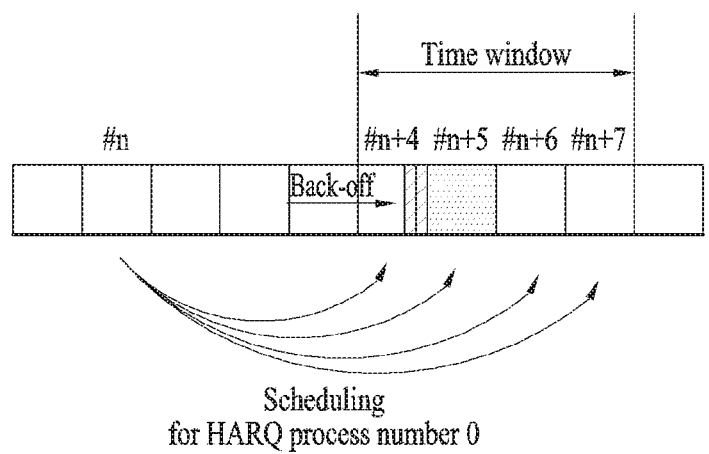
FIG. 24 is a diagram illustrating an operation of identically configuring HARQ processes of a plurality of PUSCHs according to multi-subframe scheduling.

FIG. 24 is a diagram illustrating an operation of identically configuring HARQ processes of a plurality of PUSCHs according to multi-subframe scheduling.

As shown in FIG. 24, if a base station is able to indicate PUSCH transmission in 4 subframes, the base station can identically configure a HARQ process number (e.g., 0) of PUSCH to be transmitted in the 4 subframes. Then, a UE can comprehend PUSCH transmission for a HARQ process #0 indicated by DCI as a meaning that multi-subframe transmission indicated by the DCI is to be performed in the 4 subframes.

3.13 Embodiment 13

When a base station indicates a UE to perform time window (e.g., TW1, TW2)-based transmission on a different PUSCH (e.g., first PUSCH, second PUSCH), if a PUSCH (e.g., first PUSCH) is successfully transmitted in a specific UL subframe and a UL subframe right after the specific UL subframe is included in a time window of another PUSCH (e.g., second PUSCH), the UE transmits the second PUSCH without a separate LBT operation.

In this case, the UE can transmit the first PUSCH and the second PUSCH in a row under a condition that MCOT (maximum channel occupancy time) is not violated.

When the base station is able to indicate specific PUSCH to be transmitted in a time window according to the aforementioned embodiment 12 or a different method, time windows for PUSCHs different from each other may be overlapped with each other.

Figure 25:
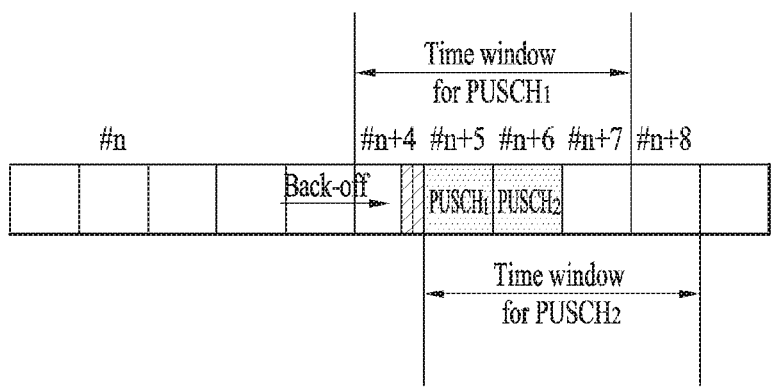
FIG. 25 is a diagram illustrating an operation when time windows for PUSCHs different from each other are overlapped with each other.

FIG. 25 is a diagram illustrating an operation when time windows for PUSCHs different from each other are overlapped with each other.

As shown in FIG. 25, a base station transmits a UL grant to a specific UE in an $n^{th}$ subframe to indicate a time window (e.g., $(n+4)^{th}$ subframe, $(n+5)^{th}$ subframe, $(n+6)^{th}$ subframe, and $(n+7)^{th}$ subframe) including a length of 4 subframes for PUSCH1 and transmits a UL grant to the same UE in an $(n+1)^{th}$ subframe to indicate a time window (e.g., $(n+5)^{th}$ subframe, $(n+6)^{th}$ subframe, $(n+7)^{th}$ subframe, and $(n+8)^{th}$ subframe) including a length of 4 subframes for PUSCH2. In this case, if the UE successfully performs first PUSCH transmission in the $(n+5)^{th}$ subframe and MCOT is equal to or greater than a length of 2 subframes, it may naturally consider an operation of performing second PUSCH transmission in the $(n+6)^{th}$ subframe.

3.14 Embodiment 14

When a base station configures a set of subframes capable of transmitting a UL grant in advance, informs a UE (or a different base station belonging to a network) of the set, and transmits a UL grant (or UL grant only), the base station performs one of UL LBT operations described in the following to achieve FR (frequency reuse factor) 1.

(1) The base station performs back-off counter UL LBT not including a reservation signal prior to a subframe in which a UL grant is transmitted.

(2) The base station performs CCA-based UL LBT on a single CCA slot prior to a subframe in which a UL grant is transmitted.

In LAA system according to the embodiment of the present invention, although UL transmission between two UEs different from each other is not detected in a CCA procedure due to a distance between the two UEs, DL transmission transmitted to a UE can be detected by a CCA procedure of another UE. Hence, when a base station performs self-scheduling, although there is UL traffic exist only, if a UL grant is transmitted via an unlicensed band, UL transmission of a UE receiving a service from a different base station can be blocked.

Hence, the present invention designs UL LBT to make UL grant transmission timing to be adjusted between base stations and make FR to be supported. Hence, when a base station performs UL transmission, the present invention proposes a method of reducing a case of blocking the UL transmission as much as possible. In this case, the UL grant transmission can be restricted to a case of transmitting the UL grant only without data transmission.

3.15 Embodiment 15

When a base station transmits a UL grant only without DL data, a DL LBT operation for transmitting the UL grant can be managed irrespective of PDSCH and LBT operations described in the following can be performed.

(1) Cat. 4 and an LBT scheme that fixes a CWS value (2) Cat. 4 and a scheme of adjusting a CWS value on the basis of whether or not PUSCH corresponding to a transmitted UL grant is transmitted In particular, when a base station performs an LBT operation to transmit a UL grant (e.g., DCI), the present invention proposes a method of controlling a contention window size parameter value applied to the LBT operation on the basis of whether or not PUSCH corresponding to a previously transmitted UL grant is transmitted.

In LAA system according to the embodiment of the present invention, an LBT scheme referred to as category 4 (Cat. 4) is proposed as a DL LBT operation. As shown in Table 2 in the following, LBT parameter for the category 4 DL LBT includes a defer period length, a CWS (contention window size) value, an MCOT (maximum channel occupancy time) value, etc. according to each class for the total 4 channel access priority classes. In particular, the base station performs random back-off by utilizing LBT parameters determined according to the channel access priority class. If the base station accesses a channel after the random back-off is finished, the base station can perform signal transmission within the MCOT.

For example, in case of the channel access priority class 1/2/3/4, the MCOT value is configured by 2/3/8/8 ms, respectively. In environment where other RAT (radio access technology) does not exist, the MCOT value is determined by 2/3/10/10 ms.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Additionally, when UL transmission is supported in LAA system, if a base station transmits a UL grant without DL data, since the operation corresponds to a sort of DL transmission, it may consider an operation of applying the Cat. 4 defined by DL LBT. In this case, although it is able to configure HARQ-ACK information on PDSCH to be utilized in Cat. 4 CWS adjustment procedure of the DL LBT, if a UL grant is transmitted only, since there is no HARQ-ACK information corresponding to the UL grant, it may be difficult to adjust a CWS.

Hence, the present invention proposes a method of using a fixed CWS (in this case, a CWS value can be configured irrespective of a value for transmitting PDSCH) while applying the Cat. 4 to a case of transmitting a UL grant only. Or, when a base station transmits a UL grant and fails to transmit PUSCH corresponding to the UL grant, the base station considers it as a collision and may increase a CWS for the UL grant. In this case, if the base station succeeds in transmitting the PUSCH corresponding to the UL grant, the base station can initialize the CWS with a minimum value (or specific value).

The abovementioned configuration can be applied to both a case that the base station operates by self-carrier scheduling and transmits a UL grant and an LBT operation together in an unlicensed band and a case that the base station operates by cross-carrier scheduling and performs an LBT operation on a UL grant.

4. Device Configuration

Figure 26:
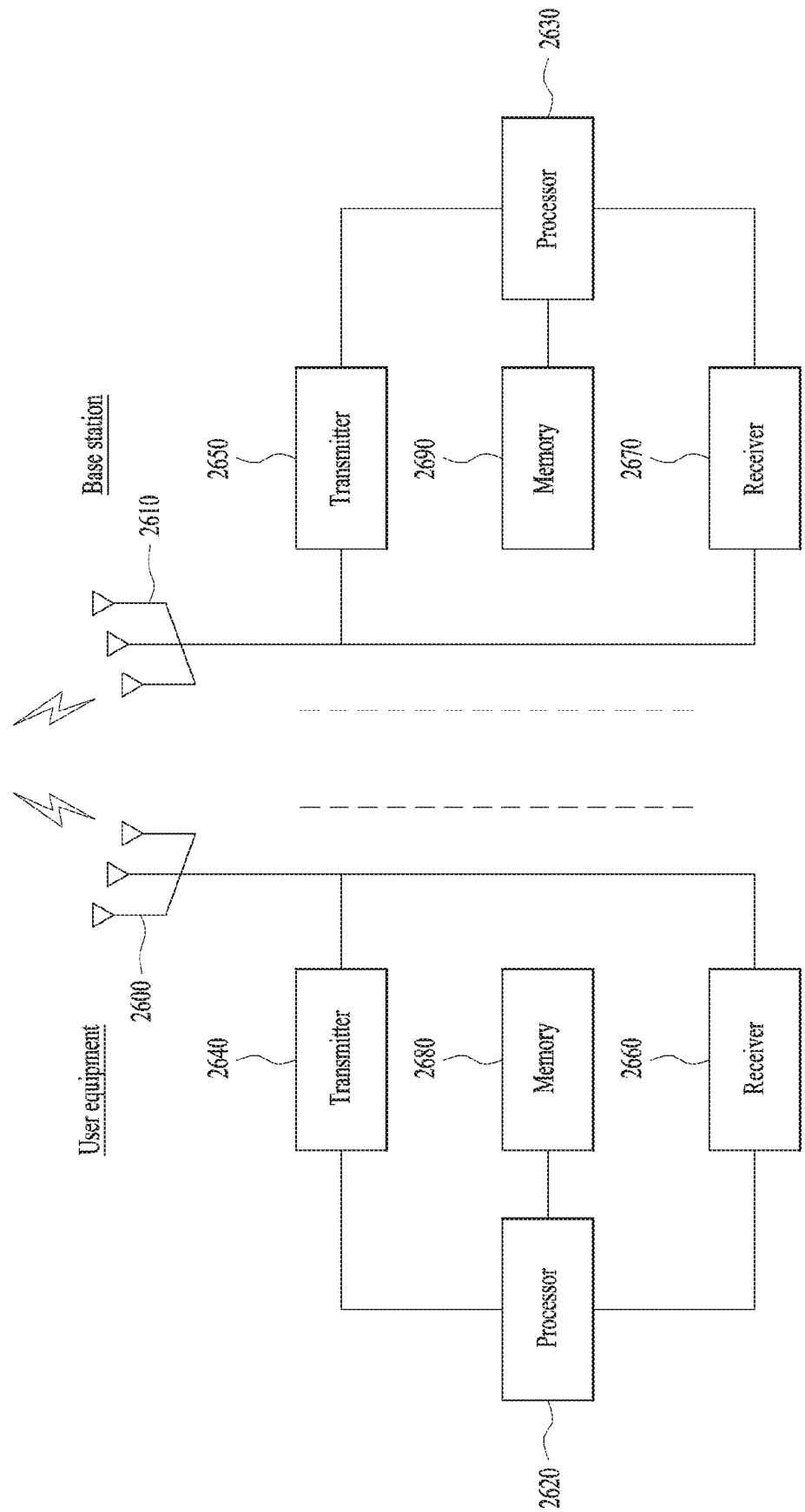
FIG. 26 is a diagram illustrating configurations of a UE and a base station capable of being implemented by the embodiments proposed in the present invention.

FIG. 26 is a diagram illustrating configurations of a UE and a base station capable of being implemented by the embodiments proposed in the present invention. The UE and the base station shown in FIG. 26 operate to implement the embodiments for a method of transmitting and receiving a signal between the base station and the UE.

A UE may act as a transmission end on a UL and as a reception end on a DL. An eNB may act as a reception end on a UL and as a transmission end on a DL.

That is, each of the UE and the eNB may include a Transmitter (Tx) 2640 or 2650 and a Receiver (Rx) 2660 or 2670, for controlling transmission and reception of information, data, and/or messages, and an antenna 2600 or 2610 for transmitting and receiving information, data, and/or messages.

Each of the UE and the eNB may further include a processor 2620 or 2630 for implementing the afore-described embodiments of the present disclosure and a memory 2680 or 2690 for temporarily or permanently storing operations of the processor 2620 or 2630.

The UE receives first DL control information indicating whether a type of scheduling UL signal transmission for one or more subframes corresponds to first type scheduling or second type scheduling from the base station via the processor 2620. If the first DL control information indicates the first type scheduling, the UE transmits a UL signal in one or more subframes which are configured on the basis of the timing at which the first DL control information is received. If the first DL control information indicates the second type scheduling, the UE receives second DL control information indicating a UL signal to be transmitted in the one or more subframes from the base station. It may be able to configure the UL signal to be transmitted in the one or more subframes which are configured on the basis of the timing at which the second DL control information is received.

The base station transmits first DL control information indicating whether a type of scheduling UL signal transmission for one or more subframes corresponds to first type scheduling or second type scheduling to the UE via the processor 2630. If the first DL control information indicates the first type scheduling, the base station receives a UL signal in one or more subframes which are configured on the basis of the timing at which the first DL control information is transmitted. If the first DL control information indicates the second type scheduling, the base station transmits second DL control information indicating a UL signal to be transmitted in the one or more subframes to the UE. It may be able to configure the UL signal to be received in the one or more subframes which are configured on the basis of the timing at which the second DL control information is transmitted.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 26 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting an uplink data by a user equipment to a base station in a wireless communication system supporting an unlicensed band, the method comprising:
receiving, from the base station, first downlink control information including information on a scheduling type of uplink data transmission in one or more subframes, the scheduling type corresponding to a first scheduling type or a second scheduling type;
based on the first downlink control information relating to the first scheduling type:
performing channel access to the unlicensed band; and
transmitting, via the unlicensed band based on the channel access to the unlicensed band, the uplink data in one or more first subframes determined based on a timing of reception of the first downlink control information; and
based on the first downlink control information relating to the second scheduling type:
receiving, from the base station, second downlink control information triggering the uplink data transmission scheduled by the first downlink control information;
performing channel access to the unlicensed band; and
transmitting, via the unlicensed band based on the channel access to the unlicensed band, the uplink data in one or more second subframes determined based on a timing of reception of the second downlink control information and offset information included in the first downlink control information.

2. The method of claim 1, wherein the information on the scheduling type of the uplink data transmission is composed of a 1 bit indicator.

3. The method of claim 1, wherein the first scheduling type is a normal scheduling and the second scheduling type is a triggering scheduling.

4. The method of claim 1, wherein based on the first downlink control information relating to the first scheduling type, the uplink data is transmitted in the one or more first subframes after 4 subframes have elapsed from the timing of the reception of the first downlink control information.

5. The method of claim 1, wherein based on the first downlink control information relating to the second scheduling type, the uplink data is transmitted in the one or more second subframes occurring after timing of the reception of the second downlink control information.

6. The method of claim 1, wherein based on the first downlink control information relating to the second scheduling type, the uplink data is transmitted in the one or more second subframes occurring after the timing of the reception of the second downlink control information only when the second downlink control information is received within a prescribed time period from the timing of the reception of the first downlink control information.

7. A method of receiving an uplink data by a base station from a user equipment in a wireless communication system supporting an unlicensed band, the method comprising:
transmitting, to the user equipment, first downlink control information including information on scheduling type of uplink data transmission in one or more subframes, the scheduling type corresponding to a first scheduling type or a second scheduling type;
based on the first downlink control information relating to the first scheduling type:
receiving the uplink data in one or more first subframes determined based on a timing of transmission of the first downlink control information via the unlicensed band; and
based on the first downlink control information relating to the second scheduling type:
transmitting, to the user equipment, second downlink control information triggering the uplink data transmission scheduled by the first downlink control information; and
receiving, via the unlicensed band, the uplink data in one or more subframes determined based on a timing of transmission of the second downlink control information and offset information included in the first downlink control information.

8. The method of claim 7, wherein the information on the scheduling type of the uplink data transmission is composed of a 1-bit indicator.

9. The method of claim 7, wherein the first scheduling type is a normal scheduling and the second scheduling type is a triggering scheduling.

10. The method of claim 7, wherein based on the first downlink control information relating to the first scheduling type, the uplink data is received in the one or more first subframes after 4 subframes have elapsed from the timing of the transmission of the first downlink control information.

11. The method of claim 7, wherein based on the first downlink control information relating to the second scheduling type, the uplink data is received in the one or more second subframes occurring after the timing of the transmission the second downlink control information.

12. The method of claim 7, wherein based on the first downlink control information relating to the second scheduling type, the uplink data is received in the one or more second subframes occurring after the timing of the transmission of the second downlink control information only when the second downlink control information is transmitted within a prescribed time period from the timing of the transmission of the first downlink control information.

13. The method of claim 7, wherein the base station performs channel access to the unlicensed band for transmission of at least the first downlink control information or the second downlink control information, and wherein a contention window size parameter applied to the channel access to the unlicensed band is adjusted based on whether or not an uplink data relating to previously transmitted downlink control information is received from the user equipment before the second downlink control information is transmitted.

14. A user equipment configured to transmit an uplink data to a base station in a wireless communication system supporting an unlicensed band, the user equipment comprising:
- a receiver;
- a transmitter; and
- a processor configured to operate in a manner of being connected with the receiver and the transmitter, wherein the processor is configured to:
- receive, from the base station, first downlink control information including information on a scheduling type of uplink data transmission in one or more subframes, the scheduling type corresponding to a first scheduling type or a second scheduling type;
- based on the first downlink control information relating to the first scheduling type:
  - perform channel access to the unlicensed band; and
  - transmit, via the unlicensed band based on the channel access to the unlicensed band, the uplink data in one or more first subframes determined based on a timing of reception the first downlink control information; and
- based on the first downlink control information relating to the second scheduling type:
  - receive, from the base station, second downlink control information triggering the uplink data transmission scheduled by the first downlink control information;
  - perform channel access to the unlicensed band; and
  - transmit, via the unlicensed band based on the channel access to the unlicensed band, the uplink data in one or more second subframes determined based on a timing of reception of the second downlink control information and offset information included in the first downlink control information.

15. A base station configured to receive an uplink data from a user equipment in a wireless communication system supporting an unlicensed band, the base station comprising:
- a receiver;
- a transmitter; and
- a processor configured to operate in a manner of being connected with the receiver and the transmitter, wherein the processor is configured to:
- transmit, to the user equipment, first downlink control information including information on a scheduling type of uplink data transmission in one or more subframes, the scheduling type corresponding to a first scheduling type or a second scheduling type;
- based on the first downlink control information relating to the first scheduling type:
  - receive, via the unlicensed band, the uplink data in one or more first subframes determined based on a timing of transmission of the first downlink control information; and
- based on the first downlink control information relating to the second scheduling type:
  - transmit, to the user equipment, second downlink control information triggering the uplink data transmission scheduled by the first downlink control information; and
  - receive, via the unlicensed band, the uplink data in one or more subframes determined based on a timing of transmission of the second downlink control information and offset information included in the first downlink control information.

16. The method of claim 1, wherein based on the first downlink control information relating to the second scheduling type, the user equipment transmits the uplink data after at least 4 ms from the timing of the reception of the first downlink control information.

\* \* \* \* \*